(12) United States Patent
Tsukuba

(10) Patent No.: US 12,149,691 B2
(45) Date of Patent: Nov. 19, 2024

(54) IMAGE PROCESSING DEVICE AND METHOD

(71) Applicant: Sony Group Corporation, Tokyo (JP)

(72) Inventor: Takeshi Tsukuba, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 108 days.

(21) Appl. No.: 17/775,311

(22) PCT Filed: Nov. 12, 2020

(86) PCT No.: PCT/JP2020/042196
§ 371 (c)(1),
(2) Date: May 9, 2022

(87) PCT Pub. No.: WO2021/100588
PCT Pub. Date: May 27, 2021

(65) Prior Publication Data
US 2022/0385904 A1    Dec. 1, 2022

Related U.S. Application Data

(60) Provisional application No. 62/939,102, filed on Nov. 22, 2019.

(51) Int. Cl.
*H04N 19/12* (2014.01)
*H04N 19/186* (2014.01)
(Continued)

(52) U.S. Cl.
CPC .......... *H04N 19/12* (2014.11); *H04N 19/186* (2014.11); *H04N 19/70* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 2021/0195222 A1* | 6/2021 | Egilmez | H04N 19/647 |
| 2022/0007035 A1* | 1/2022 | Lee | H04N 19/119 |
| 2022/0264151 A1* | 8/2022 | Lim | H04N 19/61 |

FOREIGN PATENT DOCUMENTS

| | | |
|---|---|---|
| EP | 3454559 A1 | 3/2019 |
| TW | 202133615 A | 9/2021 |

OTHER PUBLICATIONS

Tsukuba T et al (Sony): "Non-CE6:TU/TB-level LFNST index coding", 15. JVET Meeting; Jul. 3, 2019-Jul. 12, 2019; Gothenburg; (The Joint Video Exploration Team of ISO/IEC JTC1/SC29/WG11 and ITU-T SG.16 ), No. JVET-O0352; m48470 Jun. 28, 2019 (Jun. 28, 2019), XP030219312,.

(Continued)

*Primary Examiner* — Clifford Hilaire
(74) *Attorney, Agent, or Firm* — XSENSUS LLP

(57) ABSTRACT

The present disclosure relates to an image processing device and method for enabling suppression of reduction in encoding efficiency.
Encoding of secondary transform control information that is control information related to secondary transform is omitted in a case where a transform skip flag of at least one component among valid components in image encoding is true, and the secondary transform control information is encoded in a case where the transform skip flags of all the components among the valid components in image encoding are false. The present disclosure can be applied to, for example, an image processing device, an image encoding device, an image decoding device, a transmission device, a reception device, a transmission/reception device, an information processing device, an imaging device, a reproduction device, an electronic device, an image processing method, an information processing method, or the like.

20 Claims, 19 Drawing Sheets

(51) Int. Cl.
H04N 19/70 (2014.01)
H04N 19/96 (2014.01)

(56) References Cited

OTHER PUBLICATIONS

International Search Report and Written Opinion mailed on Jan. 19, 2021, received for PCT Application PCT/JP2020/042196, Filed on Nov. 12, 2020, 7 pages including English Translation.
Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, pp. 1-465.
Chiang et al., "LFNST signalling cleanup with TS checking", Joint Video Experts Team (JVET) of ITU-T SG 16 WP 3 and ISO/IEC JTC 1/SC 29/WG 11, JVET-Q0193-v2, Jan. 7-17, 2020, pp. 1-11.
Tsukuba et al., "CE8: Chroma Transform Skip (CE8-3.2)", Joint Video Experts Team (JVET) of ITU-T SG 16 WP 3 and ISO/IEC JTC 1/SC 291WG 11, JVET-00081-v2, Jul. 3-12, 2019, pp. 1-10.
Tsukuba et al., "On Interaction of LFNST and Transform skip", Joint Video Experts Team (JVET) of ITU-T SG 16 WP 3 and ISO/IEC JTC 1/SC 29/WG 11, JVET-Q0099-v1, Jan. 7-17, 2020, pp. 1-6.
Chen et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, JVET-P2002-v1, Oct. 1-11, 2019, pp. 1-89.
"Advanced video coding for generic audiovisual services", Series H: Audiovisual and Multimedia Systems ITU-T, Telecommunication Standardization Sector of ITU, H.264, Apr. 2017, pp. 1-787.
"High efficiency video coding", Series H: Audiovisual and Multimedia Systems, ITU-T, Telecommunication Standardization Sector of ITU, H.265, Dec. 2016, pp. 1-643.

* cited by examiner

FIG. 1

| | | | | | | |
|---|---|---|---|---|---|---|
| transform_tree( x0, y0, cbWidth, cbHeight, treeType, chType ) | | | | | | |
| LfnstDcOnly = 1 | | | | | | |
| LfnstZeroOutSigCoeffFlag = 1 | | | | | | |
| MtsZeroOutSigCoeffFlag = 1 | | | | | | |
| lfnstWidth = ( treeType == DUAL_TREE_CHROMA ) ? cbWidth / SubWidthC : ( ( IntraSubPartitionsSplitType == ISP_VER_SPLIT ) ? cbWidth / NumIntraSubPartitions : cbWidth ) | | | | | | |
| lfnstHeight = ( treeType == DUAL_TREE_CHROMA ) ? cbHeight / SubHeightC : ( ( IntraSubPartitionsSplitType == ISP_HOR_SPLIT ) ? cbHeight / NumIntraSubPartitions : cbHeight ) | | | | | | |
| if( Min( lfnstWidth, lfnstHeight ) >= 4 && sps_lfnst_enabled_flag == 1 && CuPredMode[ chType ][ x0 ][ y0 ] == MODE_INTRA && <span style="background:#ccc">transform_skip_flag</span> && ( treeType != DUAL_TREE_CHROMA || intra_mip_flag[ x0 ][ y0 ] ) && Min( lfnstWidth, lfnstHeight ) >= 16 ) && Max( cbWidth, cbHeight ) <= MaxTbSize ) { | | | | | | |
| if( ( IntraSubPartitionsSplitType != ISP_NO_SPLIT || LfnstDcOnly == 0 ) && LfnstZeroOutSigCoeffFlag == 1 ) | | | | | | |
| lfnst_idx | | | | | | ae(v) |
| } | | | | | | |

FIG. 2

| treeType | transform_skip_flag[0] | transform_skip_flag[1] | transform_skip_flag[2] | lfnst_idx_signaling |
|---|---|---|---|---|
| SINGLE_TREE | 1 | 0 | 0 | Infer to 0 |
| SINGLE_TREE | 1 | 0 | 1 | Infer to 0 |
| SINGLE_TREE | 1 | 1 | 0 | Infer to 0 |
| SINGLE_TREE | 1 | 1 | 1 | Infer to 0 |
| SINGLE_TREE | 0 | 0 | 0 | possible |
| SINGLE_TREE | 0 | 0 | 1 | possible |
| SINGLE_TREE | 0 | 1 | 0 | possible |
| SINGLE_TREE | 0 | 1 | 1 | possible |
| DUAL_TREE_LUMA | 1 | - | - | Infer to 0 |
| DUAL_TREE_LUMA | 0 | - | - | possible |
| DUAL_TREE_CHROMA | - | 0 | 0 | possible |
| DUAL_TREE_CHROMA | - | 0 | 1 | possible |
| DUAL_TREE_CHROMA | - | 1 | 0 | possible |
| DUAL_TREE_CHROMA | - | 1 | 1 | possible |

FIG. 3

| treeType | transform_skip_flag[0] | transform_skip_flag[1] | transform_skip_flag[2] | lfnst_idx_signaling |
|---|---|---|---|---|
| SINGLE_TREE | 1 | 0 | 0 | Infer to 0 |
| | 1 | 0 | 1 | Infer to 0 |
| | 1 | 1 | 0 | Infer to 0 |
| | 1 | 1 | 1 | Infer to 0 |
| | 0 | 0 | 0 | possible |
| | 0 | 0 | 1 | Infer to 0 |
| | 0 | 1 | 0 | Infer to 0 |
| | 0 | 1 | 1 | Infer to 0 |
| DUAL_TREE_LUMA | 0 | - | - | possible |
| | 1 | - | - | Infer to 0 |
| DUAL_TREE_CHROMA | - | 0 | 0 | possible |
| | - | 0 | 1 | Infer to 0 |
| | - | 1 | 0 | Infer to 0 |
| | - | 1 | 1 | Infer to 0 |

FIG. 4

| | | | ae(v) |
|---|---|---|---|
| ~~modeUsed~~ ~~treeType == DUAL_TREE_LUMA && transform_skip_flag[x0][y0][0]~~ ~~treeType == DUAL_TREE_CHROMA && transform_skip_flag[x0][y0][1] == 0~~ ~~treeType == SINGLE_TREE && transform_skip_flag[x0][y0][1] == 0 && transform_skip_flag[x0][y0][2] == 0 &&~~ ~~transform_skip_flag[x0][y0][0] == 0))~~ if( Min( lfnstWidth, lfnstHeight ) >= 4 && sps_lfnst_enabled_flag == 1 && CuPredMode[ chType ][ x0 ][ y0 ] == MODE_INTRA && ~~nonISP~~ && ( treeType != DUAL_TREE_CHROMA || ( !intra_mip_flag[ x0 ][ y0 ] || Min( lfnstWidth, lfnstHeight ) >= 16 ) ) && Max( cbWidth, cbHeight ) <= MaxTbSizeY) { | | | |
| if( ( IntraSubPartitionsSplitType != ISP_NO_SPLIT || LfnstDcOnly == 0 ) && LfnstZeroOutSigCoeffFlag == 1 ) | | | |
| lfnst_idx | | | |
| } | | | |

FIG. 5

```
NonTsUsed = ( ( ( treeType == DUAL_TREE_LUMA &&
                  transform_skip_flag[ x0 ][ y0 ][ 0 ] == 0 ) ||
                ( treeType == DUAL_TREE_CHROMA &&
                  transform_skip_flag[ x0 ][ y0 ][ 1 ] == 0 &&
                  transform_skip_flag[ x0 ][ y0 ][ 2 ] == 0 ) ||
                ( treeType == SINGLE_TREE &&
                  transform_skip_flag[ x0 ][ y0 ][ 0 ] == 0 &&
                  transform_skip_flag[ x0 ][ y0 ][ 1 ] == 0 &&
                  transform_skip_flag[ x0 ][ y0 ][ 2 ] == 0 ) )

condition = Min( lfnstWidth, lfnstHeight ) >= 4 &&
            sps_lfnst_enabled_flag == 1 &&
            CuPredMode[ chType ][ x0 ][ y0 ] == MODE_INTRA &&
            NonTsUsed == &&
            ( treeType != DUAL_TREE_CHROMA ||
              !intra_mip_flag[ x0 ][ y0 ] |
              Min( lfnstWidth, lfnstHeight ) >= 16 ) &&
            Max( cbWidth, cbHeight ) <= MaxTbSizeY &&
            ( IntraSubPartitionsSplitType != ISP_NO_SPLIT ||
              LfnstDcOnly == 0 ) &&
            LfnstZeroOutSigCoeffFlag == 1
```

FIG. 6

| | | | |
|---|---|---|---|
| transform_skip_flag[x0][y0] lfnst_enabled_flag[x0][y0] lfnst_skip_flag[x0][y0] | | | ae(v) |
| if( Min( lfnstWidth, lfnstHeight ) >= 4 && sps_lfnst_enabled_flag == 1 && CuPredMode[ chType ][ x0 ][ y0 ] == MODE_INTRA && BlkSz && ( treeType != DUAL_TREE_CHROMA \|\| intra_mip_flag[ x0 ][ y0 ] \|\| Min( lfnstWidth, lfnstHeight ) >= 16 ) && Max( cbWidth, cbHeight ) <= MaxTbSizeY ) { if( ( IntraSubPartitionsSplitType != ISP_NO_SPLIT \|\| LfnstDcOnly == 0 ) && LfnstZeroOutSigCoeffFlag == 1 ) | | | |
| lfnst_idx | | | |
| } | | | |

FIG. 7

```
tsUsed = ( transform_skip_flag[ x0 ][ y0 ][ 0 ] = = 0 ||
          transform_skip_flag[ x0 ][ y0 ][ 1 ] = = 0 ||
          transform_skip_flag[ x0 ][ y0 ][ 2 ] = = 0 )

condition = Min( lfnstWidth, lfnstHeight ) >= 4 &&
            sps_lfnst_enabled_flag = = 1 &&
            CuPredMode[ chType ][ x0 ][ y0 ] = = MODE_INTRA &&
            tsUsed==0 &&
            ( treeType != DUAL_TREE_CHROMA ||
              !intra_mip_flag[ x0 ][ y0 ] ||
              Min( lfnstWidth, lfnstHeight ) >= 16 ) &&
            Max( cbWidth, cbHeight ) <= MaxTbSizeY &&
            ( IntraSubPartitionsSplitType != ISP_NO_SPLIT ||
              LfnstDcOnly = = 0 ) &&
            LfnstZeroOutSigCoeffFlag = = 1
```

FIG. 8

| treeType | transform_skip_flag[0] | transform_skip_flag[1] | transform_skip_flag[2] | lfnst_idx_signaling |
|---|---|---|---|---|
| SINGLE_TREE | 1 | 0 | 0 | possible |
| | 1 | 0 | 1 | possible |
| | 1 | 1 | 0 | possible |
| | 1 | 1 | 1 | Infer to 0 |
| | 0 | 0 | 0 | possible |
| | 0 | 0 | 1 | possible |
| | 0 | 1 | 0 | possible |
| | 0 | 1 | 1 | possible |
| DUAL_TREE_LUMA | 1 | - | - | Infer to 0 |
| DUAL_TREE_CHROMA | - | 0 | 0 | possible |
| | - | 0 | 1 | possible |
| | - | 1 | 0 | possible |
| | - | 1 | 1 | Infer to 0 |

FIG. 9

| treeType | transform_skip_flag[0] | transform_skip_flag[1] | transform_skip_flag[2] | lfnst_idx_signaling |
|---|---|---|---|---|
| SINGLE_TREE | 1 | 0 | 0 | Infer to 0 |
| SINGLE_TREE | 1 | 0 | 1 | Infer to 0 |
| SINGLE_TREE | 1 | 1 | 0 | Infer to 0 |
| SINGLE_TREE | 1 | 1 | 1 | Infer to 0 |
| SINGLE_TREE | 0 | 0 | 0 | possible |
| SINGLE_TREE | 0 | 0 | 1 | possible |
| SINGLE_TREE | 0 | 1 | 0 | possible |
| SINGLE_TREE | 0 | 1 | 1 | possible |
| DUAL_TREE_LUMA | 1 | - | - | Infer to 0 |
| DUAL_TREE_LUMA | 0 | - | - | possible |
| DUAL_TREE_CHROMA | - | 0 | 0 | possible |
| DUAL_TREE_CHROMA | - | 0 | 1 | possible |
| DUAL_TREE_CHROMA | - | 1 | 0 | possible |
| DUAL_TREE_CHROMA | - | 1 | 1 | Infer to 0 |

FIG. 10

| treeType | transform_skip_flag[0] | transform_skip_flag[1] | transform_skip_flag[2] | lfnst_idx_signaling |
|---|---|---|---|---|
| SINGLE_TREE | 1 | 0 | 0 | Infer to 0 |
| SINGLE_TREE | 1 | 0 | 1 | Infer to 0 |
| SINGLE_TREE | 1 | 1 | 0 | Infer to 0 |
| SINGLE_TREE | 0 | 1 | 1 | Infer to 0 |
| SINGLE_TREE | 0 | 0 | 0 | possible |
| SINGLE_TREE | 0 | 0 | 1 | possible |
| SINGLE_TREE | 0 | 1 | 0 | possible |
| DUAL_TREE_LUMA | 1 | - | - | possible |
| DUAL_TREE_LUMA | - | - | 0 | Infer to 0 |
| DUAL_TREE_CHROMA | - | 0 | 1 | Infer to 0 |
| DUAL_TREE_CHROMA | - | 1 | 0 | Infer to 0 |
| DUAL_TREE_CHROMA | - | 1 | 1 | Infer to 0 |

IMAGE PROCESSING DEVICE AND METHOD

CROSS-REFERENCE TO RELATED APPLICATIONS

The present application is based on PCT filing PCT/JP2020/042196, filed Nov. 12, 2020, which claims priority to U.S. Provisional Application No. 62/939,102, filed Nov. 22, 2019, the entire contents of each are incorporated herein by reference.

TECHNICAL FIELD

The present disclosure relates to an image processing device and method, and particularly relates to an image processing device and method for enabling suppression of reduction in encoding efficiency.

BACKGROUND ART

In the past, there has been proposed an encoding method for deriving a prediction residual of a moving image, performing coefficient transform, quantizing, and encoding (for example, Non-Patent Document 1). In versatile video coding (VVC) described in Non-Patent Document 1, there has been an encoding tool that performs low frequency non-separable transform (LFNST) as secondary transform for a transform coefficient after primary transform and further improves energy compaction. Then, secondary transform control information that is control information regarding the secondary transform has been signaled (that is, the secondary transform control information has been encoded and transmitted to a decoding side).

For example, an LFNST identifier (lfnst_idx) indicating a mode of LFNST has been signaled as the secondary transform control information. This LFNST identifier has been signaled according to values of a tree type (treeType) and of a transform skip flag (transform_skip_flag). The transform skip flag is flag information indicating whether or not to skip (omit) coefficient transform including primary transform, secondary transform, and the like in image encoding. Note that this transform skip flag also indicates whether or not to skip (omit) inverse processing (inverse transform) of the coefficient transform in image decoding.

CITATION LIST

Non-Patent Document

Non-Patent Document 1: Benjamin Bross, Jianle Chen, Shan Liu, Ye-Kui Wang, "Versatile Video Coding (Draft 7)", JVET-P2001-vE, Joint Video Experts Team (JVET) of ITU-T SG 16 WP 3 and ISO/IEC JTC 1/SC 29/WG 11 16th Meeting: Geneva, CH, 1-11 Oct. 2019

SUMMARY OF THE INVENTION

Problems to be Solved by the Invention

However, in the case of the method described in Non-Patent Document 1, and even in a case where the tree type is a dual tree chroma (DUAL_TREE_CHROMA) and the transform skip flags of both a Cb component and a Cr component of an image are true (for example, 1), the LFNST identifier is signaled, which may cause redundancy. That is, there has been a possibility that the encoding efficiency is reduced.

The present disclosure has been made in view of the foregoing, and is intended to enable suppression of reduction in the encoding efficiency.

Solutions to Problems

An image processing device according to one aspect of the present technology is an image processing device including: an encoding unit configured to omit encoding of secondary transform control information that is control information related to secondary transform in a case where a transform skip flag of at least one component among valid components in image encoding is true; and encode the secondary transform control information in a case where the transform skip flags of all the components among the valid components in image encoding are false.

An image processing method according to one aspect of the present technology is an image processing method including: omitting encoding of secondary transform control information that is control information related to secondary transform in a case where a transform skip flag of at least one component among valid components in image encoding is true; and encoding the secondary transform control information in a case where the transform skip flags of all the components among the valid components in image encoding are false.

An image processing device according to another aspect of the present technology is an image processing device including: a decoding unit configured to omit decoding related to secondary transform control information that is control information related to secondary transform and estimates that a value of the secondary transform control information is a predetermined value indicating skip of the secondary transform in a case where a transform skip flag of at least one component among valid components in image decoding is true; and decode a bitstream to generate the secondary transform control information in a case where the transform skip flags of all the components among the valid components in image decoding are false.

An image processing method according to another aspect of the present technology is an image processing method including: omitting decoding related to secondary transform control information that is control information related to secondary transform and estimating that a value of the secondary transform control information is a predetermined value indicating skip of the secondary transform in a case where a transform skip flag of at least one component among valid components in image decoding is true; and decoding a bitstream to generate the secondary transform control information in a case where the transform skip flags of all the components among the valid components in image decoding are false.

In the image processing device and the image processing method according to one aspect of the present technology, encoding of secondary transform control information that is control information related to secondary transform is omitted in a case where a transform skip flag of at least one component among valid components in image encoding is true, and the secondary transform control information is encoded in a case where the transform skip flags of all the components among the valid components in image encoding are false.

In the image processing device and the image processing method according to another aspect of the present technology, decoding related to secondary transform control information that is control information related to secondary transform is omitted and it is estimated that a value of the secondary transform control information is a predetermined value indicating skip of the secondary transform in a case where a transform skip flag of at least one component among valid components in image decoding is true, and a bitstream is decoded to generate the secondary transform control information in a case where the transform skip flags of all the components among the valid components in image decoding are false.

BRIEF DESCRIPTION OF DRAWINGS

FIG. 1 is a diagram illustrating an example of a syntax table regarding an LFNST identifier.

FIG. 2 is a diagram illustrating an example of an LFNST identifier based on a tree type and a transform skip flag.

FIG. 3 is a diagram illustrating an example of an LFNST identifier based on a tree type and a transform skip flag.

FIG. 4 is a diagram illustrating an example of a syntax table regarding an LFNST identifier.

FIG. 5 is a diagram illustrating an example of an encoding condition.

FIG. 6 is a diagram illustrating an example of a syntax table regarding an LFNST identifier.

FIG. 7 is a diagram illustrating an example of an encoding condition.

FIG. 8 is a diagram illustrating an example of an LFNST identifier based on a tree type and a transform skip flag.

FIG. 9 is a diagram illustrating an example of an LFNST identifier based on a tree type and a transform skip flag.

FIG. 10 is a diagram illustrating an example of an LFNST identifier based on a tree type and a transform skip flag.

MODE FOR CARRYING OUT THE INVENTION

Figure 11:
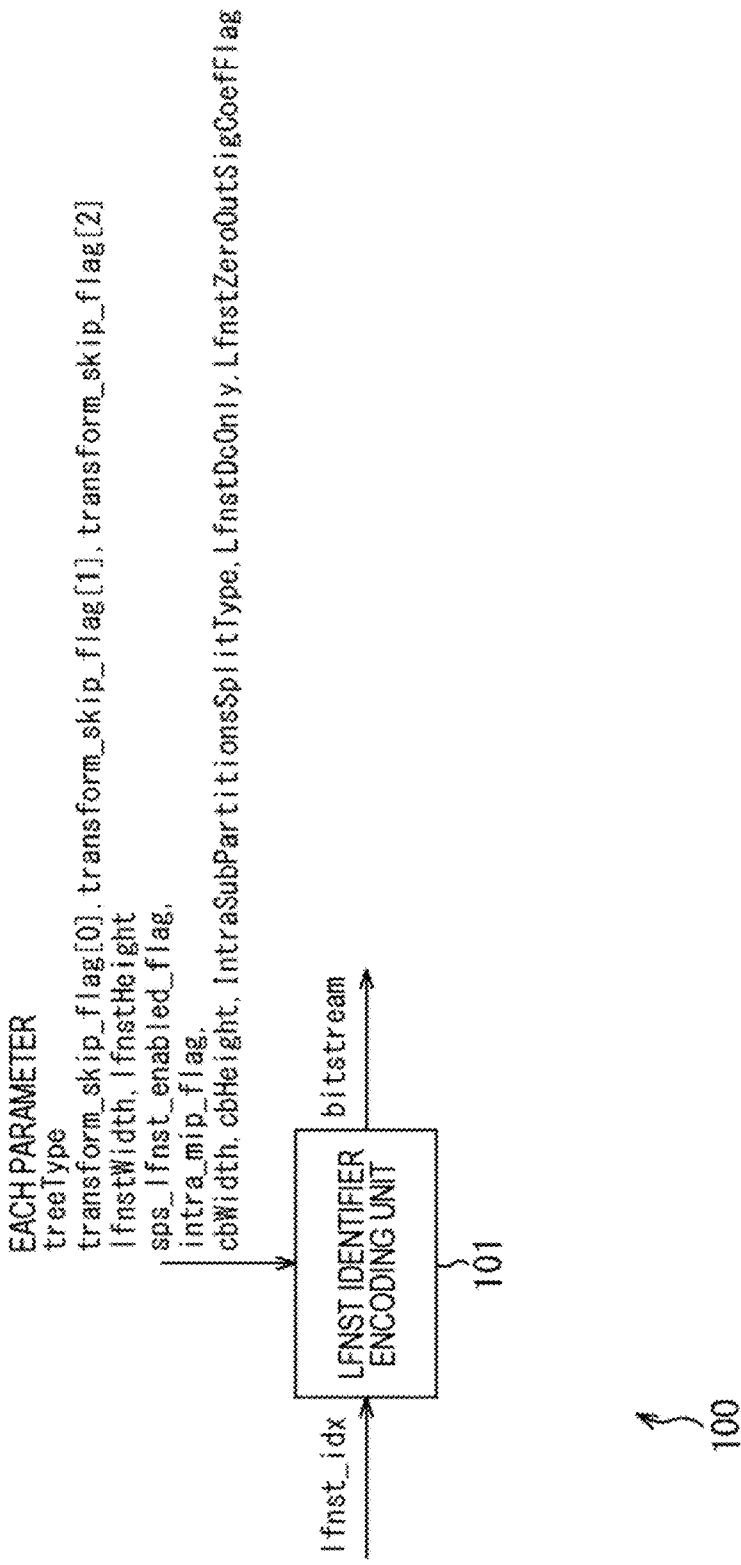
FIG. 11 is a block diagram illustrating a main configuration example of an image encoding device.

Hereinafter, modes for implementing the present disclosure (hereinafter referred to as embodiments) will be described. Note that the description will be given in the following order.
1. Signaling pattern of LFNST identifier
2. First embodiment (encoding device)
3. Second embodiment (decoding device)
4. Third embodiment (image encoding device)
5. Fourth embodiment (image decoding device)
6. Supplementary note 1. Signaling Pattern of LFNST Identifier <Documents and the Like that Support Technical Content and Technical Terms>

The scope disclosed in the present technology includes not only the content described in the embodiments but also the content described in the following non-patent documents and the like and the content of other documents referred to in the following non-patent documents that are known at the time of filing the application.

Non-Patent Document 1: (described above)
Non-Patent Document 2: Jianle Chen, Yan Ye, Seung Hwan Kim, "Algorithm description for Versatile Video Coding and Test Model 7 (VTM 7)", JVET-P2002-vl, Joint Video Experts Team (JVET) of ITU-T SG 16 WP 3 and ISO/IEC JTC 1/SC 29/WG 11 16th Meeting: Geneva, CH, 1-11 Oct. 2019
Non-Patent Document 3: Recommendation ITU-T H.264 (April 2017) "Advanced video coding for generic audiovisual services", April 2017
Non-Patent Document 4: Recommendation ITU-T H.265 (February 18) "High efficiency video coding", February 2018

That is, the content described in Non-Patent Documents above also serves as a basis for determining the support requirements. For example, the quad-tree block structure and the quad tree plus binary tree (QTBT) block structure described in Non-Patent Documents above fall within the disclosure range of the present technology even if these pieces of content are not directly described in the examples, and satisfy the support requirements of the claims. Furthermore, for example, technical terms such as parsing, syntax, and semantics similarly fall within the disclosure range of the present technology even in the case where these technical terms are not directly described in the examples, and satisfy the support requirements of claims.

Furthermore, in the present specification, a "block" (not a block indicating a processing unit) used for description as a partial region or a unit of processing of an image (picture) indicates an arbitrary partial region in a picture unless otherwise specified, and the size, shape, characteristics, and the like of the block are not limited. For example, the "block" includes an arbitrary partial region (unit of processing) such as a transform block (TB), a transform unit (TU), a prediction block (PB), a prediction unit (PU), a smallest coding unit (SCU), a coding unit (CU), a largest coding unit (LCU), a coding tree block (CTB), a coding tree unit (CTU), a subblock, a macro block, a tile, or a slice, described in Non-Patent Documents above.

Furthermore, in specifying the size of such a block, not only the block size is directly specified but also the block size may be indirectly specified. For example, the block size may be specified using identification information for identifying the size. Furthermore, for example, the block size may be specified by a ratio or a difference from the size of a reference block (for example, an LCU, an SCU, or the like). For example, in a case of transmitting information for specifying the block size as a syntax element or the like, information for indirectly specifying the size as described above may be used as the information. With the configuration, the amount of information can be reduced, and the encoding efficiency can be improved in some cases. Furthermore, the specification of the block size also includes specification of a range of the block size (for example, specification of a range of an allowable block sizes, or the like).

Furthermore, in the present specification, encoding includes not only the whole processing of transforming an image into a bitstream but also part of the processing. For example, encoding includes not only processing that includes prediction processing, orthogonal transform, quantization, arithmetic encoding, and the like but also processing that collectively refers to quantization and arithmetic encoding, processing including prediction processing, quantization, and arithmetic encoding, and the like. Similarly, decoding includes not only the whole processing of transforming a bitstream into an image but also part of the processing. For example, decoding includes not only processing including inverse arithmetic decoding, inverse quantization, inverse orthogonal transform, prediction processing, and the like but also processing including inverse arithmetic decoding and inverse quantization, processing including inverse arithmetic decoding, inverse quantization, and prediction processing, and the like.

<LFNST Identifier>

In versatile video coding (VVC) described in Non-Patent Document 1, there has been an encoding tool that performs low frequency non-separable transform (LFNST) as secondary transform for a transform coefficient after primary transform and further improves energy compaction. Then, secondary transform control information that is control information regarding the secondary transform has been signaled (that is, the secondary transform control information has been encoded by an encoder and transmitted to a decoding side (decoder)).

For example, an LFNST identifier (lfnst_idx) that is an identifier indicating a mode of LFNST has been signaled as the secondary transform control information. A case where a value of the LFNST identifier (lfnst_idx) is "0" indicates that secondary transform (LFNST) is skipped (omitted). Furthermore, a case where the value of the LFNST identifier (lfnst_idx) is "1" indicates that secondary transform according to a first method is applied. Moreover, a case where the value of the LFNST identifier (lfnst_idx) is "2" indicates that secondary transform according to a second method is applied. Note that, as described will be described below, signaling of the LFNST identifier (lfnst_idx) can be skipped (omitted). In the case where the signaling of the LFNST identifier (lfnst_idx) is skipped, the decoding side (decoder) estimates the value.

The decoder can perform inverse secondary transform, which is inverse processing of the secondary transform, in a mode corresponding to the secondary transform performed in the encoder, on the basis of the LFNST identifier (or the estimated LFNST identifier) thus signaled from the encoding side (encoder). That is, the secondary transform control information can also be referred to as control information related to inverse secondary transform. Furthermore, the LFNST identifier can also be said to be an identifier indicating a mode of inverse processing of LFNST performed as the inverse secondary transform.

By signaling the LFNST identifier as described above, the encoding side (encoder) could control the inverse secondary transform at the decoding side (decoder). That is, the encoder could cause the decoder to perform the inverse secondary transform in the mode corresponding to the secondary transform at the time of encoding.

FIG. 1 illustrates an example of a syntax table regarding the LFNST identifier in the VVC described in Non-Patent Document 1. As illustrated in FIG. 1, in a case where conditions in the seventh and eighth rows from the top of this syntax table are satisfied, the LFNST identifier (lfnst_idx) illustrated in the ninth row from the top is signaled.

That is, this LFNST identifier has been signaled according to values of a tree type (treeType) and of a transform skip flag (transform_skip_flag). The transform skip flag is flag information indicating whether or not to skip (omit) coefficient transform including primary transform, secondary transform, and the like in image encoding. Note that this transform skip flag also indicates whether or not to skip (omit) inverse processing (inverse transform) of the coefficient transform in image decoding.

FIG. 2 illustrates an example of correspondence between a combination of the tree type and the transform skip flag, and signaling of the LFNST identifier. In FIG. 2, the tree types include three types: SINGLE_TREE, DUAL_TREE_LUMA, and DUAL_TREE_CHROMA. Furthermore, transform_skip_flag[0] indicates the transform skip flag of a luminance (Y) component. transform_skip_flag[1] indicates the transform skip flag of a chrominance (Cb) component. transform skip_flag[2] indicates the transform skip flag of a chrominance (Cr) component. "0" and "1" in columns of each transform skip flag in the table illustrated in FIG. 2 indicate values of the transform skip flag. In this example, the value "1" indicates true and the value "0" indicates false. Note that the transform skip flag of an invalid component (Y, Cb, or Cr) of each tree type is not signaled. In FIG. 2, the value of the transform skip flag of such an invalid component is indicated by "-".

In this example, in a case where the value of transform_skip_flag[0] is "O" or in a case where the tree type is DUAL_TREE_CHROMA, the LFNST identifier can be signaled (possible). Otherwise, the signaling of the LFNST identifier is skipped (omitted). In this case, in the decoder, the value of the LFNST identifier is estimated to be "0" (Infer to 0).

However, as illustrated in the bottom row of the table of FIG. 2, even in a case where the tree type is a dual tree chroma (DUAL_TREE_CHROMA) and the transform skip flags of both the Cb component and the Cr component of an image are true (for example, 1), the LFNST identifier has been signaled. As described above, in the case where the transform skip flag is true, the coefficient transform (inverse coefficient transform) is skipped, and therefore the secondary transform (inverse secondary transform) is also skipped. In the case where the tree type is the dual tree chroma (DUAL_TREE_CHROMA), the valid components are Cb and Cr. Therefore, when the transform skip flags of these components are true, the secondary transform (inverse secondary transform) is always skipped. Therefore, there has been a possibility that signaling of the LFNST identifier becomes redundant. That is, there has been a possibility that the encoding efficiency is unnecessarily reduced.

Method 1

Therefore, the signaling of the LFNST identifier is skipped in a case where the transform skip flag of at least one component among the valid components is true (method 1).

For example, in an image processing method, encoding of secondary transform control information that is control information related to secondary transform is omitted in a case where a transform skip flag of at least one component among valid components in image encoding is true, and the secondary transform control information is encoded in a case where the transform skip flags of all the components among the valid components in image encoding are false.

For example, in an image processing device, an encoding unit is provided, which omits encoding of secondary transform control information that is control information related to secondary transform in a case where a transform skip flag of at least one component among valid components in image encoding is true, and encodes the secondary transform control information in a case where the transform skip flags of all the components among the valid components in image encoding are false.

For example, in an image processing method, decoding related to secondary transform control information that is control information related to secondary transform is omitted and it is estimated that a value of the secondary transform control information is a predetermined value indicating skip of the secondary transform in a case where a transform skip flag of at least one component among valid components in image decoding is true, and a bitstream is decoded to generate the secondary transform control information in a case where the transform skip flags of all the components among the valid components in image decoding are false.

For example, an image processing device is provided with a decoding unit that omits decoding related to secondary transform control information that is control information related to secondary transform and estimates that a value of the secondary transform control information is a predetermined value indicating skip of the secondary transform in a case where a transform skip flag of at least one component among valid components in image decoding is true, and decodes a bitstream to generate the secondary transform control information in a case where the transform skip flags of all the components among the valid components in image decoding are false.

Note that the decoding regarding the secondary transform control information is to decode a bitstream (also referred to as coded data) generated by encoding the secondary transform control information to generate the secondary transform control information. Furthermore, the predetermined value indicating skip of the secondary transform is arbitrary. For example, "0" may be set.

Note that the secondary transform control information may be any information as long as it is control information regarding secondary transform, and may include, for example, a secondary transform identifier that is an identifier indicating a type of the secondary transform (and inverse secondary transform).

Furthermore, the secondary transform may be any coefficient transform, and may be, for example, low frequency non-separable transform (LFNST). In that case, the inverse secondary transform may be inverse processing of LFNST. Furthermore, in this case, the secondary transform identifier is an LFNST identifier (lfnst_idx). Then, the predetermined value indicating skip of the secondary transform may be "0" (lfnst_idx==0).

FIG. 3 illustrates an example of correspondence between a combination of the tree type and the transform skip flag, and signaling of the LFNST identifier, in the case of applying the method 1. FIG. 3 is a table corresponding to the table in FIG. 2. The secondary transform is LFNST, and an LFNST identifier is signaled as secondary transform information. Furthermore, the predetermined value indicating skip of the secondary transform is assumed to be "0" (lfnst_idx==0).

As in the case of FIG. 2, the tree types include three types: SINGLE_TREE, DUAL_TREE_LUMA, and DUAL TREE CHROMA. Furthermore, transform skip flag[0] indicates the transform skip flag of a luminance (Y) component. transform_skip_flag[1] indicates the transform skip flag of a chrominance (Cb) component. transform_skip_flag[2] indicates the transform skip flag of a chrominance (Cr) component. "0" and "1" in the column of each transform skip flag indicate the value of the transform skip flag. In this example, the value "1" indicates true and the value "0" indicates false. Note that the transform skip flag (the transform skip flag indicated by "-") of an invalid component (Y, Cb, or Cr) of each tree type is not signaled.

In this example, the LFNST identifier can be signaled (possible) only in a case where the transform skip flags of all the components in the valid components are false (value "0"), regardless of the tree type. The signaling of the LFNST identifier is skipped (omitted) in a case where the transform skip flag of at least one component in the valid components is true (value "1"). In this case, on the decoding side (decoder), the value of the LFNST identifier is estimated to be "0" (that is, the value indicating skip of the secondary transform) (Infer to 0).

By doing so, in a case where the tree type is a dual tree chroma (DUAL TREE CHROMA) and the transform skip flags of both the Cb component and the Cr component of an image are true, signaling of the LFNST identifier can be skipped (the bottom row of the table of FIG. 3). Then, even if the signaling of the LFNST identifier is skipped in this way, the decoder can skip the inverse secondary transform on the basis of the LFNST identifier. That is, the decoder can obtain the LFNST identifier having a value that does not contradict the signaled transform skip flag, and can correctly perform image decoding. In other words, the encoder can correctly control the inverse secondary transform in the decoder.

That is, by applying the above-described method 1, redundancy of signaling of the LFNST identifier can be suppressed, and reduction in the encoding efficiency can be suppressed.

For example, in a case where the tree type of image encoding is a single tree (SINGLE_TREE), Y, Cb, and Cr are valid components. Therefore, in this case, when at least one of the Y component transform skip flag, the Cb component transform skip flag, and the Cr component transform skip flag is true, encoding of the secondary transform control information is skipped. That is, in this case, signaling of the LFNST identifier (lfnst_idx) is skipped. Then, in the decoder, the value of the LFNST identifier is estimated to be "0" (Infer to 0). Note that the Y component transform skip flag is a transform skip flag (transform_skip_flag[0]) of the Y component. The Cb component transform skip flag is a transform skip flag (transform_skip_flag[1]) of the Cb component. The Cr component transform skip flag is a transform skip flag (transform_skip_flag[2]) of the Cr component.

In contrast, when the Y component transform skip flag, the Cb component transform skip flag, and the Cr component transform skip flag are false, the secondary transform control information can be encoded (possible). That is, the LFNST identifier (lfnst_idx) is signaled.

Furthermore, for example, in a case where the tree type of image decoding is a single tree, and at least one of the Y component transform skip flag, the Cb component transform skip flag, and the Cr component transform skip flag is true, decoding of the secondary transform control information is skipped. Then, the value of the secondary transform control information is estimated to be a predetermined value indicating skip of the secondary transform. That is, in this case, decoding regarding the LFNST identifier (lfnst_idx) is skipped. Then, the value of the LFNST identifier is estimated to be "0" (Infer to 0). In contrast, when the Y component transform skip flag, the Cb component transform skip flag, and the Cr component transform skip flag are false, a bitstream is decoded to generate the secondary transform control information. That is, the signaled LFNST identifier (lfnst_idx) is obtained.

Note that, in the case of the example in FIG. 2, in a case where the tree type is a single tree and the Y component transform skip flag is false (transform skip flag[0]==0), the LFNST identifier (lfnst_idx) has been signaled.

In contrast, in the case of the example of FIG. 3, in a case where the tree type is a single tree and the Y component transform skip flag is false, and moreover, in a case where the Cb component transform skip flag and the Cr component transform skip flag are not false (transform_skip_flag[1]==0 && transform_skip_flag[2]==0), the signaling of the LFNST identifier (lfnst_idx) is skipped. Therefore, the decoder can suppress an increase in capacity of a buffer. Furthermore, an increase in a delay of the decoding processing can be suppressed.

For example, in a case where the tree type of the image encoding is dual tree luma (DUAL_TREE_LUMA), the luminance Y is a valid component. Therefore, in this case, when the Y component transform skip flag is true, encoding of the secondary transform control information is skipped. That is, in this case, signaling of the LFNST identifier (lfnst_idx) is skipped. Then, in the decoder, the value of the LFNST identifier is estimated to be "0" (Infer to 0). In contrast, when the Y component transform skip flag is false, the secondary transform control information can be encoded (possible). That is, the LFNST identifier (lfnst_idx) is signaled.

Furthermore, for example, in the case where the tree type of the image decoding is dual tree luma, and when the Y component transform skip flag is true, decoding regarding the secondary transform control information is skipped. Then, the value of the secondary transform control information is estimated to be a predetermined value indicating skip of the secondary transform. That is, in this case, decoding regarding the LFNST identifier (lfnst_idx) is skipped. Then, the value of the LFNST identifier is estimated to be "0" (Infer to 0). In contrast, when the Y component transform skip flag is false, a bitstream is decoded to generate the secondary transform control information. That is, the signaled LFNST identifier (lfnst_idx) is obtained.

For example, in a case where the tree type of the image encoding is a dual tree chroma (DUAL_TREE_CHROMA), the chrominances Cb and Cr are valid components. Therefore, in this case, when at least one of the Cb component transform skip flag or the Cr component transform skip flag is true, encoding of the secondary transform control information is skipped. That is, in this case, signaling of the LFNST identifier (lfnst_idx) is skipped. Then, in the decoder, the value of the LFNST identifier is estimated to be "0" (Infer to 0). In contrast, when the Cb component transform skip flag and the Cr component transform skip flag are false, the secondary transform control information can be encoded (possible). That is, the LFNST identifier (lfnst_idx) is signaled.

Furthermore, for example, in a case where the tree type of image decoding is a dual tree chroma, and at least one of the Cb component transform skip flag and the Cr component transform skip flag is true, decoding of the secondary transform control information is omitted. Then, the value of the secondary transform control information is estimated to be a predetermined value indicating skip of the secondary transform. That is, in this case, decoding regarding the LFNST identifier (lfnst_idx) is skipped. Then, the value of the LFNST identifier is estimated to be "0" (Infer to 0). In contrast, when the Cb component transform skip flag and the Cr component transform skip flag are false, a bitstream is decoded to generate the secondary transform control information. That is, the signaled LFNST identifier (lfnst_idx) is obtained.

FIG. 4 illustrates an example of a syntax table regarding the LFNST identifier in the case of applying the method 1 to the VVC described in Non-Patent Document 1. In this case, the encoder (or the decoder) sets a variable nonTsUsed for the valid component for each tree type as illustrated in the top of FIG. 4. The variable nonTsUsed is a variable indicating whether or not the transform skip is not applied. A case where the value is true (for example, "1") indicates that the transform skip is not applied. A case where the value is false (for example, "0") indicates that transform skip has been applied.

For example, in a case where the tree type is dual tree luma, and the Y component transform skip flag is false (treeType==DUAL_TREE_LUMA && transform_skip_flag[x0][y0][0]==0), the variable nonTsUsed is set to true (nonTsUsed==1). In contrast, when the Y component transform skip flag is true, the variable nonTsUsed is set to false (nonTsUsed==0).

Furthermore, in a case where the tree type is a dual tree chroma, and the Cb component transform skip flag and the Cr component transform skip flag are false (treeType==DUAL TREE_CHROMA && transform_skip_flag[x0][y0][1]==0 && transform_skip_flag[x0][y0][2]==0), the variable nonTsUsed is set to true (nonTsUsed==1). In contrast, when the Cb component transform skip flag or the Cr component transform skip flag is true, the variable nonTsUsed is set to false (nonTsUsed==0).

Moreover, in a case where the tree type is a single tree, and the Y component transform skip flag, the Cb component transform skip flag, and the Cr component transform skip flag are false (treeType==SINGLE_TREE && transform_skip_flag[x0][y0][0]==0 && transform_skip_flag[x0][y0][1]==0 && transform_skip_flag[x0][y0][2]==0), the variable nonTsUsed is set to true (nonTsUsed==1). In contrast, when at least one of the Y component transform skip flag, the Cb component transform skip flag, or the Cr component transform skip flag is true, the variable nonTsUsed is set to false (nonTsUsed==0).

Then, whether or not to signal the LFNST identifier (lfnst_idx) is controlled using the variable nonTsUsed as one of conditions. For example, in a case where this variable nonTsUsed is true (nonTsUsed==1) and the other conditions are met, the encoder encodes the LFNST identifier (lfnst_idx). Furthermore, the decoder also decodes the LFNST identifier (lfnst_idx).

Furthermore, in a case where the variable nonTsUsed is false (nonTsUsed==0), the encoder skips encoding the LFNST identifier (lfnst_idx). Furthermore, the decoder skips decoding regarding the LFNST identifier (lfnst_idx) and estimates that the value of the LFNST identifier (lfnst_idx) is "0".

FIG. 5 is a diagram illustrating an encoding condition (decoding condition) condition of the LFNST identifier equivalent to the syntax table of FIG. 4. For example, the encoder sets the variable NonTsUsed (upper side in FIG. 5) for each tree type. Then, the encoder sets an encoding condition (lower side in FIG. 5) of the LFNST identifier, using the variable NonTsUsed as one of conditions. Then, in a case where the encoding condition is true, the encoder signals the LFNST identifier (lfnst_idx). In a case where the encoding condition is false, the encoder skips signaling of the LFNST identifier (lfnst_idx).

For example, the decoder sets the variable NonTsUsed (upper side in FIG. 5) for each tree type. Then, the decoder sets a decoding condition (lower side in FIG. 5) of the LFNST identifier, using the variable NonTsUsed as one of conditions. The, the decoder decodes the bitstream to obtain the signaled LFNST identifier (lfnst_idx) in a case where the decoding condition is true. In a case where the decoding condition is false, the decoder skips decoding regarding the LFNST identifier (lfnst_idx) and estimates that the value of the LFNST identifier (lfnst_idx) is "0".

By doing so, it is possible to suppress reduction in the encoding efficiency in the VVC described in Non-Patent Document 1.

Note that a negative expression may be used in a conditional expression as in the syntax table illustrated in FIG. 6. The syntax table illustrated in FIG. 6 corresponds to the syntax table illustrated in FIG. 4, but uses the variable TsUsed instead of the variable nonTsUsed in FIG. 4. The variable TsUsed is a variable indicating whether or not the transform skip has been applied, and a case where this value is true (for example, "1") indicates that the transform skip has been applied. A case where the value is false (for example, "0") indicates that the transform skip has not applied.

For example, the variable TsUsed is set as illustrated in the top of FIG. 6. That is, when at least one of the Y component transform skip flag, the Cb component transform skip flag, or the Cr component transform skip flag is true (transform_skip_flag[x0][y0][0]==1||transform_skip_flag[x0][y0][1]==1||transform_skip_flag[x0][y0][2]==1), the variable TsUsed is set to true (TsUsed==1). In contrast, when the Y component transform skip flag, the Cb component transform skip flag, and the Cr component transform skip flag are false, the variable TsUsed is set to false (TsUsed==0).

Then, whether or not to signal the LFNST identifier (lfnst_idx) is controlled using the variable TsUsed as one of conditions. For example, in a case where this variable TsUsed is false (TsUsed==0) and the other conditions are met, the encoder encodes the LFNST identifier (lfnst_idx) and the decoder decodes the LFNST identifier (lfnst_idx).

Furthermore, in a case where the variable TsUsed is true (TsUsed==1), the encoder skips encoding of the LFNST identifier (lfnst_idx). Then, the decoder skips decoding regarding the LFNST identifier (lfnst_idx) and estimates that the value of the LFNST identifier (lfnst_idx) is "0".

FIG. 7 is a diagram illustrating an encoding condition (decoding condition) condition of the LFNST identifier equivalent to the syntax table of FIG. 6. For example, the encoder sets the variable TsUsed (upper side in FIG. 7). Then, the encoder sets an encoding condition condition (lower side in FIG. 7) of the LFNST identifier, using the variable TsUsed as one of conditions. Then, in a case where the encoding condition is true, the encoder signals the LFNST identifier (lfnst_idx). In a case where the encoding condition is false, the encoder skips signaling of the LFNST identifier (lfnst_idx).

For example, the decoder sets the variable TsUsed (upper side in FIG. 7). Then, the decoder sets a decoding condition (lower side in FIG. 7) of the LFNST identifier, using the variable TsUsed as one of the conditions. The, the decoder decodes the bitstream to obtain the signaled LFNST identifier (lfnst_idx) in a case where the decoding condition is true. In a case where the decoding condition is false, the decoder skips decoding regarding the LFNST identifier (lfnst_idx) and estimates that the value of the LFNST identifier (lfnst_idx) is "0".

By doing so, it is possible to suppress reduction in the encoding efficiency in the VVC described in Non-Patent Document 1.

Method 2

For example, the signaling of the LFNST identifier may be skipped in a case where the transform skip flags of all the components among the valid components are true (method 2).

For example, the encoding of the secondary transform control information may be omitted in a case where the transform skip flags of all the components among the valid components in image encoding are true, and the secondary transform control information may be encoded in a case where the transform skip flag of at least one component among the valid components in image encoding is false.

Furthermore, for example, the decoding related to the secondary transform control information may be omitted and it may be estimated that the value of the secondary transform control information is a predetermined value indicating skip of the secondary transform in a case where the transform skip flags of all the components among the valid components in image decoding are true, and the bitstream may be decoded to generate the secondary transform control information in a case where the transform skip flag of at least one component among the valid components in image decoding is false.

Even in the method 2, similar to the method 1, the decoding regarding the secondary transform control information is to decode a bitstream generated by encoding the secondary transform control information to generate the secondary transform control information. Furthermore, the predetermined value indicating skip of the secondary transform is arbitrary.

Moreover, the secondary transform control information may be any information as long as it is control information regarding secondary transform. For example, the secondary transform control information may include a secondary transform identifier that is an identifier indicating a type of secondary transform (and inverse secondary transform).

Furthermore, the secondary transform may be any coefficient transform. For example, the secondary transform may be LFNST. In that case, the inverse secondary transform may be inverse processing of LFNST. Furthermore, in this case, the secondary transform identifier is an LFNST identifier (lfnst_idx). Then, the predetermined value indicating skip of the secondary transform may be "0" (lfnst_idx==0).

FIG. 8 illustrates an example of correspondence between a combination of the tree type and the transform skip flag, and signaling of the LFNST identifier, in the case of applying the method 2. FIG. 8 is a table corresponding to the table in FIG. 2. The secondary transform is LFNST, and an LFNST identifier is signaled as secondary transform information. Furthermore, the predetermined value indicating skip of the secondary transform is assumed to be "0" (lfnst_idx==0).

As in the case of FIG. 2, the tree types include three types: SINGLE_TREE, DUAL_TREE_LUMA, and DUAL_TREE_CHROMA. Furthermore, transform_skip_flag[0] indicates the Y component transform skip flag. transform_skip_flag[1] indicates the Cb component transform skip flag. transform_skip_flag[2] indicates the Cr component transform skip flag. "0" and "1" in the column of each transform skip flag indicate the value of the transform skip flag. In this example, the value "1" indicates true and the value "0" indicates false. Note that the transform skip flag (the transform skip flag indicated by "-") of an invalid component (Y, Cb, or Cr) of each tree type is not signaled.

In this example, the LFNST identifier can be signaled (possible) in a case where the transform skip flag of at least one component in the valid components is false (value "0"), regardless of the tree type. The signaling of the LFNST identifier is skipped (omitted) only in a case where the transform skip flags of all the components in the valid components are true (value "1"). In this case, on the decoding side (decoder), the value of the LFNST identifier is estimated to be "0" (that is, the value indicating skip of the secondary transform) (Infer to 0).

By doing so, in a case where the tree type is a dual tree chroma (DUAL_TREE_CHROMA) and the transform skip flags of both the Cb component and the Cr component of an image are true, signaling of the LFNST identifier can be skipped (the bottom row of the table of FIG. 8). Then, even if the signaling of the LFNST identifier is skipped in this way, the decoder can skip the inverse secondary transform on the basis of the LFNST identifier. That is, the decoder can obtain the LFNST identifier having a value that does not contradict the signaled transform skip flag, and can correctly perform image decoding. In other words, the encoder can correctly control the inverse secondary transform in the decoder.

That is, by applying the above-described method 2, redundancy of signaling of the LFNST identifier can be suppressed, and reduction in the encoding efficiency can be suppressed.

For example, in a case where the tree type of image encoding is a single tree (SINGLE_TREE), Y, Cb, and Cr are valid components. Therefore, in this case, when the Y component transform skip flag, the Cb component transform skip flag, and the Cr component transform skip flag are true, encoding of the secondary transform control information is skipped. That is, in this case, signaling of the LFNST identifier (lfnst_idx) is skipped. Then, in the decoder, the value of the LFNST identifier is estimated to be "0" (Infer to 0). In contrast, when at least one of the Y component transform skip flag, the Cb component transform skip flag, or the Cr component transform skip flag is false, the secondary transform control information can be encoded (possible). That is, the LFNST identifier (lfnst_idx) is signaled.

Furthermore, for example, in a case where the tree type of image decoding is a single tree, and the Y component transform skip flag, the Cb component transform skip flag, and the Cr component transform skip flag are true, decoding of the secondary transform control information is skipped. Then, the value of the secondary transform control information is estimated to be a predetermined value indicating skip of the secondary transform. That is, in this case, decoding regarding the LFNST identifier (lfnst_idx) is skipped. Then, the value of the LFNST identifier is estimated to be "0" (Infer to 0). In contrast, when at least one of the Y component transform skip flag, the Cb component transform skip flag, or the Cr component transform skip flag is false, a bitstream is decoded to generate the secondary transform control information. That is, the signaled LFNST identifier (lfnst_idx) is obtained.

Note that, in the case of the example in FIG. 2, in a case where the tree type of image decoding is a single tree and the Y component transform skip flag is true (transform_skip_flag[0]==1), signaling of the LFNST identifier (lfnst_idx) has been skipped. Therefore, at this time, even if the Cb component transform skip flag and the Cr component transform skip flag are false (transform_skip_flag[1]==0||transform_skip_flag[2]==0), the secondary transform (LFNST) could not be applied to the Cb component and the Cr component. Therefore, there has been a possibility that the encoding efficiency of the Cb component and the Cr component is reduced.

In contrast, in the case of FIG. 8, when at least one of the Y component transform skip flag, the Cb component transform skip flag, or the Cr component transform skip flag is false, the LFNST identifier can be signaled. That is, in a case where the tree type of image decoding is a single tree and the Y component transform skip flag is true (transform_skip_flag[0]==1), and when the Cb component transform skip flag and the Cr component transform skip flag are false (transform_skip_flag[1]==0 | transform_skip_flag[2]==0), the secondary transform (LFNST) can be applied to the Cb component and the Cr component. Therefore, the reduction of the encoding efficiency of the Cb component and the Cr component can be suppressed.

For example, in a case where the tree type of the image encoding is dual tree luma (DUAL_TREE_LUMA), the luminance Y is a valid component. Therefore, in this case, when the Y component transform skip flag is true, encoding of the secondary transform control information is skipped. That is, in this case, signaling of the LFNST identifier (lfnst_idx) is skipped. Then, in the decoder, the value of the LFNST identifier is estimated to be "0" (Infer to 0). In contrast, when the Y component transform skip flag is false, the secondary transform control information can be encoded (possible). That is, the LFNST identifier (lfnst_idx) is signaled.

Furthermore, for example, in the case where the tree type of the image decoding is dual tree luma, and when the Y component transform skip flag is true, decoding regarding the secondary transform control information is skipped. Then, the value of the secondary transform control information is estimated to be a predetermined value indicating skip of the secondary transform. That is, in this case, decoding regarding the LFNST identifier (lfnst_idx) is skipped. Then, the value of the LFNST identifier is estimated to be "0" (Infer to 0). In contrast, when the Y component transform skip flag is false, a bitstream is decoded to generate the secondary transform control information. That is, the signaled LFNST identifier (lfnst_idx) is obtained.

For example, in a case where the tree type of the image encoding is a dual tree chroma (DUAL TREE CHROMA), the chrominances Cb and Cr are valid components. Therefore, in this case, when the Cb component transform skip flag and the Cr component transform skip flag are true, encoding of the secondary transform control information is skipped. That is, in this case, signaling of the LFNST identifier (lfnst_idx) is skipped. Then, in the decoder, the value of the LFNST identifier is estimated to be "0" (Infer to 0). In contrast, when at least one of the Cb component transform skip flag or the Cr component transform skip flag is false, the secondary transform control information can be encoded (possible). That is, the LFNST identifier (lfnst_idx) is signaled.

Furthermore, for example, in a case where the tree type of image decoding is a dual tree chroma, and the Cb component transform skip flag and the Cr component transform skip flag are true, decoding of the secondary transform control information is omitted. Then, the value of the secondary transform control information is estimated to be a predetermined value indicating skip of the secondary transform. That is, in this case, decoding regarding the LFNST identifier (lfnst_idx) is skipped. Then, the value of the LFNST identifier is estimated to be "0" (Infer to 0). In contrast, when at least one of the Cb component transform skip flag or the Cr component transform skip flag are false, a bitstream is decoded to generate the secondary transform control information. That is, the signaled LFNST identifier (lfnst_idx) is obtained.

Method 3

For example, in a case where the tree type is a single tree and in a case where the tree type is a dual tree luma, signaling of the LFNST identifier may be controlled by a method similar to the method described in Non-Patent Document 1, and only in a case where the tree type is a dual tree chroma (DUAL TREE CHROMA) and when the transform skip flags of all the components among the valid components in the dual tree chroma are true, signaling of the LFNST identifier may be skipped (method 3).

For example, in a case where a tree type of the image encoding is a dual tree chroma, and the encoding of the secondary transform control information may be skipped in a case where the transform skip flags of all of components among valid components in the dual tree chroma are true, and the secondary transform control information may be encoded in a case where the transform skip flag of at least one component among the valid components in the dual tree chroma is false.

Furthermore, for example, in a case where a tree type of the image decoding is a dual tree chroma, and the decoding related to the secondary transform control information may be skipped and it may be estimated that the value of the secondary transform control information is a predetermined value indicating skip of the secondary transform in a case where the transform skip flags of all of components among valid components in the dual tree chroma are true, and the bitstream may be decoded to generate the secondary transform control information in a case where the transform skip flag of at least one component among the valid components in the dual tree chroma is false.

Even in the method 3, similar to the method 1, the decoding regarding the secondary transform control information is to decode a bitstream generated by encoding the secondary transform control information to generate the secondary transform control information. Furthermore, the predetermined value indicating skip of the secondary transform is arbitrary.

Moreover, the secondary transform control information may be any information as long as it is control information regarding secondary transform. For example, the secondary transform control information may include a secondary transform identifier that is an identifier indicating a type of secondary transform (and inverse secondary transform).

Furthermore, the secondary transform may be any coefficient transform. For example, the secondary transform may be LFNST. In that case, the inverse secondary transform may be inverse processing of LFNST. Furthermore, in this case, the secondary transform identifier is an LFNST identifier (lfnst_idx). Then, the predetermined value indicating skip of the secondary transform may be "0" (lfnst_idx=0).

FIG. 9 illustrates an example of correspondence between a combination of the tree type and the transform skip flag, and signaling of the LFNST identifier, in the case of applying the method 3. FIG. 9 is a table corresponding to the table in FIG. 2. The secondary transform is LFNST, and an LFNST identifier is signaled as secondary transform information. Furthermore, the predetermined value indicating skip of the secondary transform is assumed to be "0" (lfnst_idx=0).

As in the case of FIG. 2, the tree types include three types: SINGLE TREE, DUAL TREE LUMA, and DUAL_TREE_CHROMA. Furthermore, transform_skip_flag[0] indicates the Y component transform skip flag. transform_skip_flag[1] indicates the Cb component transform skip flag. transform_skip_flag[2] indicates the Cr component transform skip flag. "0" and "1" in the column of each transform skip flag indicate the value of the transform skip flag. In this example, the value "1" indicates true and the value "0" indicates false. Note that the transform skip flag (the transform skip flag indicated by "-") of an invalid component (Y, Cb, or Cr) of each tree type is not signaled.

In this example, the tree type is a dual tree chroma, and the LFNST identifier can be signaled (possible) in a case where the transform skip flag of at least one component in the valid components in the dual tree chroma is false. In contrast, when the transform skip flags of all the components are true (value "1"), the encoding of the LFNST identifier is skipped (omitted). In this case, on the decoding side (decoder), the value of the LFNST identifier is estimated to be "0" (that is, the value indicating skip of the secondary transform) (Infer to 0).

Note that, in a case where the tree type is a single tree and a case where the tree type is a dual tree luma, signaling of the LFNST identifier is controlled by a method similar to the method described in Non-Patent Document 1. That is, signaling of the LFNST identifier is controlled similarly to the case of the table in FIG. 2.

By doing so, in a case where the tree type is a dual tree chroma (DUAL_TREE_CHROMA) and the transform skip flags of both the Cb component and the Cr component of an image are true, signaling of the LFNST identifier can be skipped (the bottom row of the table of FIG. 9). Then, even if the signaling of the LFNST identifier is skipped in this way, the decoder can skip the inverse secondary transform on the basis of the LFNST identifier. That is, the decoder can obtain the LFNST identifier having a value that does not contradict the signaled transform skip flag, and can correctly perform image decoding. In other words, the encoder can correctly control the inverse secondary transform in the decoder.

That is, by applying the above-described method 3, redundancy of signaling of the LFNST identifier can be suppressed, and reduction in the encoding efficiency can be suppressed.

Method 4

For example, in a case where the tree type is a single tree and in a case where the tree type is a dual tree luma, signaling of the LFNST identifier may be controlled by a method similar to the method described in Non-Patent Document 1, and only in a case where the tree type is a dual tree chroma (DUAL TREE CHROMA) and when the transform skip flag of at least one component among the valid components in the dual tree chroma is true, signaling of the LFNST identifier may be skipped (method 4).

For example, in a case where a tree type of the image encoding is a dual tree chroma, and the encoding of the secondary transform control information may be skipped in a case where the transform skip flag of at least one component among valid components in the dual tree chroma is true, and the secondary transform control information may be encoded in a case where the transform skip flags of all the components among the valid components in the dual tree chroma are false.

Furthermore, for example, in a case where a tree type of the image decoding is a dual tree chroma, and the decoding related to the secondary transform control information may be skipped and it may be estimated that the value of the secondary transform control information is a predetermined value indicating skip of the secondary transform in a case where the transform skip flag of at least one component among the valid components in the dual tree chroma is true, and the bitstream may be decoded to generate the secondary transform control information in a case where the transform skip flags of all the components among the valid components in the dual tree chroma are false.

Even in the method 4, similar to the method 1, the decoding regarding the secondary transform control information is to decode a bitstream generated by encoding the secondary transform control information to generate the secondary transform control information. Furthermore, the predetermined value indicating skip of the secondary transform is arbitrary.

Moreover, the secondary transform control information may be any information as long as it is control information regarding secondary transform. For example, the secondary transform control information may include a secondary transform identifier that is an identifier indicating a type of secondary transform (and inverse secondary transform).

Furthermore, the secondary transform may be any coefficient transform. For example, the secondary transform may be LFNST. In that case, the inverse secondary transform may be inverse processing of LFNST. Furthermore, in this case, the secondary transform identifier is an LFNST identifier (lfnst_idx). Then, the predetermined value indicating skip of the secondary transform may be "0" (lfnst_idx==0).

FIG. 10 illustrates an example of correspondence between a combination of the tree type and the transform skip flag, and signaling of the LFNST identifier, in the case of applying the method 4. FIG. 10 is a table corresponding to the table in FIG. 2. The secondary transform is LFNST, and an LFNST identifier is signaled as secondary transform information. Furthermore, the predetermined value indicating skip of the secondary transform is assumed to be "0" (lfnst_idx==0).

As in the case of FIG. 2, the tree types include three types: SINGLE TREE, DUAL TREE LUMA, and DUAL_TREE_CHROMA. Furthermore, transform_skip_flag[0] indicates the Y component transform skip flag. transform_skip_flag[1] indicates the Cb component transform skip flag. transform_skip_flag[2] indicates the Cr component transform skip flag. "0" and "1" in the column of each transform skip flag indicate the value of the transform skip flag. In this example, the value "1" indicates true and the value "0" indicates false. Note that the transform skip flag (the transform skip flag indicated by "-") of an invalid component (Y, Cb, or Cr) of each tree type is not signaled.

In this example, the tree type is a dual tree chroma, and the LFNST identifier can be signaled (possible) in a case where the transform skip flags of all the components in the valid components in the dual tree chroma are false. In contrast, when the transform skip flag of at least one component is true (value "1"), the encoding of the LFNST identifier is skipped (omitted). In this case, on the decoding side (decoder), the value of the LFNST identifier is estimated to be "0" (that is, the value indicating skip of the secondary transform) (Infer to 0).

Note that, similarly to the case of FIG. 3, in a case where the tree type is a single tree and a case where the tree type is a dual tree luma, signaling of the LFNST identifier is controlled by a method similar to the method described in Non-Patent Document 1. That is, signaling of the LFNST identifier is controlled similarly to the case of the table in FIG. 2.

By doing so, in a case where the tree type is a dual tree chroma (DUAL_TREE_CHROMA) and the transform skip flags of both the Cb component and the Cr component of an image are true, signaling of the LFNST identifier can be skipped (the bottom row of the table of FIG. 10). Then, even if the signaling of the LFNST identifier is skipped in this way, the decoder can skip the inverse secondary transform on the basis of the LFNST identifier. That is, the decoder can obtain the LFNST identifier having a value that does not contradict the signaled transform skip flag, and can correctly perform image decoding. In other words, the encoder can correctly control the inverse secondary transform in the decoder.

That is, by applying the above-described method 4, redundancy of signaling of the LFNST identifier can be suppressed, and reduction in the encoding efficiency can be suppressed.

Combination

Some or all of the above-described methods 1 to 4 can be appropriately combined and applied.

2. First Embodiment

<Encoding Device>

The present technology (methods 1 to 4) described in <1. Signaling pattern of LFNST identifier> can be applied to any device. Hereinafter, application examples of the present technology will be described. FIG. 11 is a block diagram illustrating an example of a configuration of an encoding device that is one mode of an image processing device to which the present technology is applied. An encoding device 100 illustrated in FIG. 11 is a device that encodes an LFNST identifier (lfnst_idx). The encoding device 100 performs encoding by applying context-based adaptive binary arithmetic code (CABAC), for example.

Note that FIG. 11 illustrates main processing units, data flows, and the like, and those illustrated in FIG. 11 are not necessarily everything. That is, in the encoding device 100, there may be a processing unit not illustrated as a block in FIG. 11, or processing or data flow not illustrated as an arrow or the like in FIG. 11.

As illustrated in FIG. 11, the encoding device 100 includes an LFNST identifier encoding unit 101.

The LFNST identifier encoding unit 101 performs processing regarding encoding of the LFNST identifier. For example, the LFNST identifier encoding unit 101 acquires the LFNST identifier (lfnst_idx) from an outside. The LFNST identifier encoding unit 101 encodes the acquired LFNST identifier to generate a bitstream. The LFNST identifier encoding unit 101 outputs the generated bitstream to the outside of the encoding device 100. This bitstream is transmitted to a decoding side (decoder) via a communication medium or the like, or is stored in a storage medium, for example.

Furthermore, the LFNST identifier encoding unit 101 acquires various parameters to be used for encoding the LFNST identifier. For example, the LFNST identifier encoding unit 101 acquires parameters such as treeType, transform skip flag[0], transform_skip_flag[1], transform_skip_flag[2], lfnstWidth, lfnstHeight, sps_lfnst_enabled_flag, intra_mip_flag, cbWidth, cbHeight, IntraSubPartitionSplitType, LfnstDcOnly, and LfnstZeroOutSigCoefFlag. These parameters are parameters described in Non-Patent Document described above (for example, Non-Patent Document 1).

Then, the LFNST identifier encoding unit 101 controls the encoding (signaling) of the LFNST identifier (lfnst_idx) as described in <1. Signaling pattern of LFNST identifier> using these parameters.

For example, the LFNST identifier encoding unit 101 controls the encoding of the LFNST identifier by applying the above-described method 1. That is, the LFNST identifier encoding unit 101 omits encoding of secondary transform control information that is control information related to secondary transform in a case where a transform skip flag of at least one component among valid components in image encoding is true, and encodes the secondary transform control information in a case where the transform skip flags of all the components among the valid components in image encoding are false.

For example, the LFNST identifier encoding unit 101 controls encoding of the LFNST identifier according to the syntax table illustrated in FIG. 4. Note that the LFNST identifier encoding unit 101 may control encoding of the LFNST identifier according to the syntax table illustrated in FIG. 6. According to these syntax tables, the LFNST identifier encoding unit 101 can control encoding of the LFNST identifier according to the tree type and the transform skip flag as in the table illustrated in FIG. 3. The control method in each tree type is as described above in <1. Signaling pattern of LFNST identifier>.

Note that the LFNST identifier encoding unit 101 may control the encoding of the LFNST identifier by applying the above-described method 2. That is, the LFNST identifier encoding unit 101 may omit the encoding of the secondary transform control information in a case where the transform skip flags of all the components among the valid components in image encoding are true, and encode the secondary transform control information in a case where the transform skip flag of at least one component among the valid components in image encoding is false.

By doing so, the LFNST identifier encoding unit 101 can control encoding of the LFNST identifier according to the tree type and the transform skip flag as in the table illustrated in FIG. 8. The control method in each tree type is as described above in <1. Signaling pattern of LFNST identifier>.

Furthermore, the LFNST identifier encoding unit 101 may control the encoding of the LFNST identifier by applying the above-described method 3. For example, in a case where a tree type of the image encoding is a dual tree chroma, and the LFNST identifier encoding unit 101 may omit the encoding of the secondary transform control information in a case where the transform skip flags of all of components among valid components in the dual tree chroma are true, and encode the secondary transform control information in a case where the transform skip flag of at least one component among the valid components in the dual tree chroma is false.

By doing so, the LFNST identifier encoding unit 101 can control encoding of the LFNST identifier according to the tree type and the transform skip flag as in the table illustrated in FIG. 9. The control method in each tree type is as described above in <1. Signaling pattern of LFNST identifier>.

Furthermore, the LFNST identifier encoding unit 101 may control the encoding of the LFNST identifier by applying the above-described method 4. For example, in a case where a tree type of the image encoding is a dual tree chroma, and the LFNST identifier encoding unit 101 may omit the encoding of the secondary transform control information in a case where the transform skip flag of at least one component among valid components in the dual tree chroma is true, and encode the secondary transform control information in a case where the transform skip flags of all the components among the valid components in the dual tree chroma are false.

By doing so, the LFNST identifier encoding unit 101 can control encoding of the LFNST identifier according to the tree type and the transform skip flag as in the table illustrated in FIG. 10. The control method in each tree type is as described above in <1. Signaling pattern of LFNST identifier>.

In any case of applying any method in the methods 1 to 4, in a case where the tree type is a dual tree chroma (DUAL_TREE_CHROMA) and the transform skip flags of both the Cb component and the Cr component of an image are true, the LFNST identifier encoding unit 101 can skip signaling of the LFNST identifier. Therefore, the encoding device 100 can suppress reduction in the encoding efficiency.

<Flow of Encoding Processing>

Figure 12:
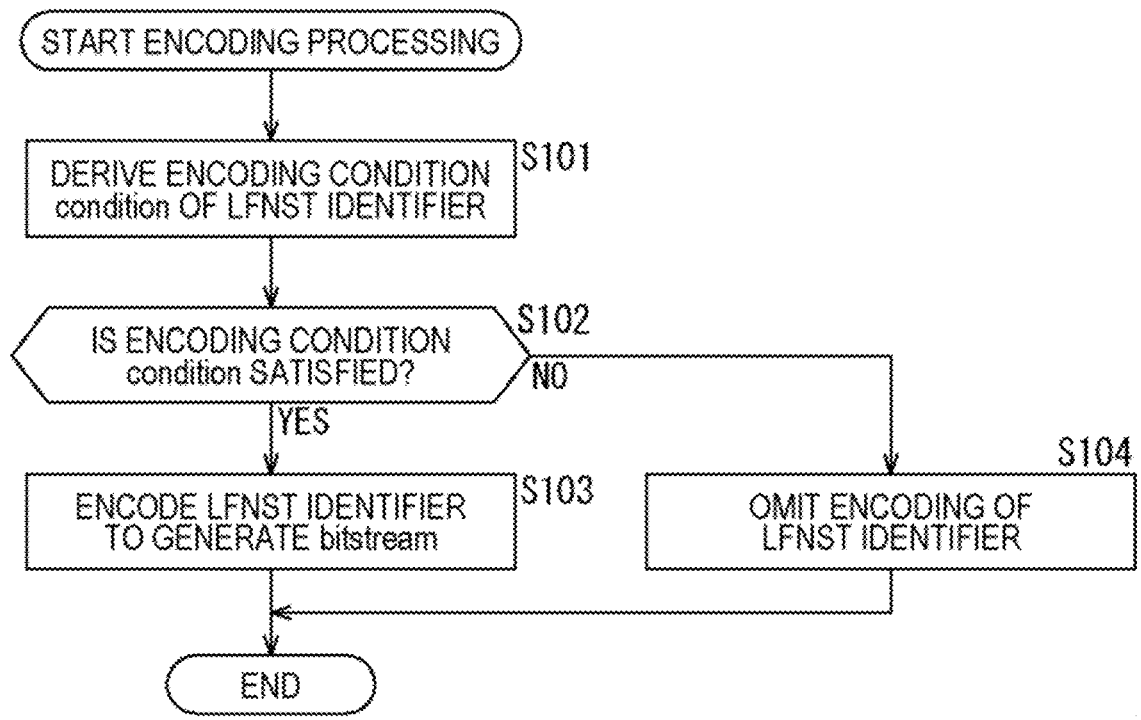
FIG. 12 is a flowchart illustrating an example of a flow of encoding processing.

Next, an example of a flow of encoding processing executed in the encoding device 100 will be described with reference to the flowchart in FIG. 12.

When the encoding processing is started, the LFNST identifier encoding unit 101 of the encoding device 100 derives the encoding condition of the LFNST identifier in step S101. For example, in the case of applying the method 1 described in <1. Signaling pattern of LFNST identifier>, the LFNST identifier encoding unit 101 omits encoding of secondary transform control information that is control information related to secondary transform in a case where a transform skip flag of at least one component among valid components in image encoding is true, and encodes the secondary transform control information in a case where the transform skip flags of all the components among the valid components in image encoding are false. For example, the LFNST identifier encoding unit 101 derives the variable NonTsUsed illustrated in FIG. 5, and derives the encoding condition illustrated in FIG. 5 using the derived variable NonTsUsed.

Note that the LFNST identifier encoding unit 101 may derive the variable TsUsed illustrated in FIG. 7 and derive the encoding condition illustrated in FIG. 7 using the derived variable TsUsed. Furthermore, the LFNST identifier encoding unit 101 may derive the encoding condition, applying any of the methods 2 to 4.

In step S102, the LFNST identifier encoding unit 101 determines whether or not the encoding condition condition is satisfied. That is, the LFNST identifier encoding unit 101 determines whether or not the encoding condition derived in step S101 is true. In a case where it is determined that the encoding condition condition is true, the processing proceeds to step S103.

In step S103, the LFNST identifier encoding unit 101 encodes the LFNST identifier (lfnst_idx) to generate a bitstream. That is, in a case where the encoding condition is satisfied, the LFNST identifier encoding unit 101 encodes the LFNST identifier (lfnst_idx) to generate a bitstream. This bitstream is supplied to the decoder via a communication medium, for example. Furthermore, this bitstream may be stored in a storage medium. When the processing in step S103 ends, the encoding processing ends.

Furthermore, in step S102, in a case where it is determined that the encoding condition derived in step S101 is false, the processing proceeds to step S104.

In step S104, the LFNST identifier encoding unit 101 skips (omits) encoding of the LFNST identifier (lfnst_idx). That is, in the case where the encoding condition is not satisfied, the LFNST identifier encoding unit 101 skips encoding the LFNST identifier (lfnst_idx). That is, in this case, the bitstream of the LFNST identifier is not generated (that is, the LFNST identifier is not signaled.). When the processing in step S104 ends, the encoding processing ends.

By executing the encoding processing in this manner, the LFNST identifier encoding unit 101 can skip signaling of the LFNST identifier when the tree type is a dual tree chroma (DUAL_TREE_CHROMA) and the transform skip flags of both a Cb component and a Cr component of an image are true, in any case of applying any method in the methods 1 to 4. Therefore, the encoding device 100 can suppress reduction in the encoding efficiency.

Supplement

Note that the encoding device 100 (LFNST identifier encoding unit 101) may encode an arbitrary secondary transform identifier (arbitrary secondary transform control information) instead of the example of the LFNST identifier. That is, the secondary transform is not limited to LFNST, and may be any coefficient transform. Furthermore, some or all of the above-described methods 1 to 4 can be appropriately combined and applied.

3. Second Embodiment

<Decoding Device>

Figure 13:
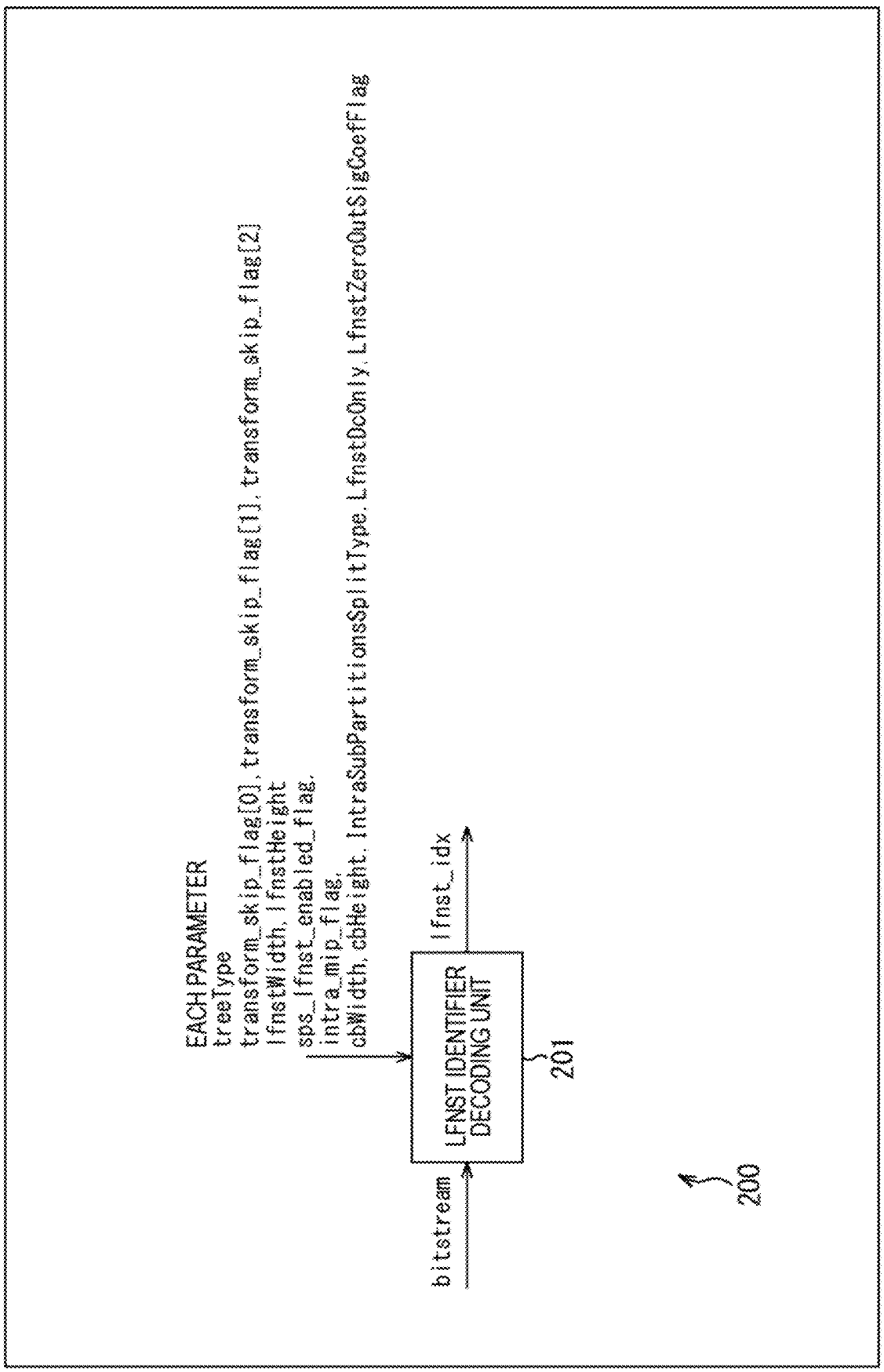
FIG. 13 is a block diagram illustrating a main configuration example of a decoding device.

FIG. 13 is a block diagram illustrating an example of a configuration of a decoding device as one mode of an image processing device to which the present technology is applied. A decoding device 200 illustrated in FIG. 13 is a device that decodes a bitstream (coded data) of an LFNST identifier (lfnst_idx). The decoding device 200 performs decoding by applying a decoding method (for example, CABAC) corresponding to the encoding method of the encoding device 100. For example, the decoding device 200 decodes a bitstream generated by the encoding device 100.

Note that FIG. 13 illustrates main processing units, data flows, and the like, and those illustrated in FIG. 13 are not necessarily everything. That is, in the decoding device 200, there may be a processing unit not illustrated as a block in FIG. 13, or processing or data flow not illustrated as an arrow or the like in FIG. 13.

As illustrated in FIG. 13, the decoding device 200 includes an LFNST identifier decoding unit 201.

The LFNST identifier decoding unit 201 performs processing regarding decoding of the LFNST identifier. For example, the LFNST identifier decoding unit 201 acquires a bitstream from the outside. The LFNST identifier decoding unit 201 decodes the acquired bitstream to generate the LFNST identifier (lfnst_idx). The LFNST identifier decoding unit 201 outputs the generated LFNST identifier to an outside of the decoding device 200. The LFNST identifier is transmitted to a decoding side (decoder) via a communication medium or the like, or stored in a storage medium, for example.

Furthermore, the LFNST identifier decoding unit 201 acquires various parameters to be used for decoding regarding the LFNST identifier. For example, the LFNST identifier decoding unit 201 acquires parameters such as treeType, transform_skip_flag[0], transform_skip_flag[1], transform_skip_flag[2], lfnstWidth, lfnstHeight, sps_lfnst_enabled_flag, intra_mip_flag, cbWidth, cbHeight, IntraSubPartitionSplitType, LfnstDcOnly, and LfnstZeroOutSigCoeffFlag. These parameters are parameters described in Non-Patent Document described above (for example, Non-Patent Document 1).

These parameters are encoded in an encoder (for example, the encoding device 100) and supplied as a bitstream (that is, signaled). The decoding device 200 acquires and decodes the bitstream to generate these parameters. Note that this decoding may be performed by a decoding unit (not illustrated) outside the LFNST identifier decoding unit 201, or may be performed by the LFNST identifier decoding unit 201.

Then, the LFNST identifier decoding unit 201 controls decoding of the LFNST identifier (lfnst_idx) as described in <1. Signaling pattern of LFNST identifier> using these parameters.

For example, the LFNST identifier decoding unit 201 controls decoding of the LFNST identifier by applying the above-described method 1. That is, the LFNST identifier decoding unit 201 omits decoding related to secondary transform control information that is control information related to secondary transform and estimates that a value of the secondary transform control information is a predetermined value indicating skip of the secondary transform in a case where a transform skip flag of at least one component among valid components in image decoding is true, and decodes a bitstream to generate the secondary transform control information in a case where the transform skip flags of all the components among the valid components in image decoding are false.

For example, the LFNST identifier decoding unit 201 controls decoding of the LFNST identifier according to the syntax table illustrated in FIG. 4. Note that the LFNST identifier decoding unit 201 may control decoding of the LFNST identifier according to the syntax table illustrated in FIG. 6. According to these syntax tables, the LFNST identifier decoding unit 201 can control decoding of the LFNST identifier according to the tree type and the transform skip flag as in the table illustrated in FIG. 3. The control method in each tree type is as described above in <1. Signaling pattern of LFNST identifier>.

Note that the LFNST identifier decoding unit 201 may control decoding of the LFNST identifier by applying the above-described method 2. That is, when the transform skip flags of all the components among the valid components in the image decoding are true, the LFNST identifier decoding unit 201 may omit the decoding related to the secondary transform control information and estimate that the value of the secondary transform control information is "0". Furthermore, when the transform skip flag of at least one component among the valid components in the image decoding is false, the LFNST identifier decoding unit 201 may perform decoding regarding the secondary transform control information.

By doing so, the LFNST identifier decoding unit 201 can control decoding of the LFNST identifier according to the tree type and the transform skip flag as in the table illustrated in FIG. 8. The control method in each tree type is as described above in <1. Signaling pattern of LFNST identifier>.

Furthermore, the LFNST identifier decoding unit 201 may control decoding of the LFNST identifier by applying the above-described method 3. That is, in a case where the tree type of the image decoding is a dual tree chroma, and the LFNST identifier decoding unit 201 may skip (omit) the decoding of the secondary transform control information and estimate that the value of the secondary transform control information is "0" in a case where the transform skip flags of all of components among valid components in the dual tree chroma are true. Furthermore, when the transform skip flag of at least one component among the valid components in the image decoding is false, the LFNST identifier decoding unit 201 may perform decoding regarding the secondary transform control information.

By doing so, the LFNST identifier decoding unit 201 can control decoding of the LFNST identifier according to the tree type and the transform skip flag as in the table illustrated in FIG. 9. The control method in each tree type is as described above in <1. Signaling pattern of LFNST identifier>.

Furthermore, the LFNST identifier decoding unit 201 may control decoding of the LFNST identifier by applying the above-described method 4. That is, in the case where the tree type of the image decoding is a dual tree chroma, and the LFNST identifier decoding unit 201 may omit the decoding of the secondary transform control information and estimate that the value of the secondary transform control information is "0" in a case where the transform skip flag of at least one component among the valid components in the dual tree chroma is true. Furthermore, when the transform skip flags of all the components are false, decoding regarding the secondary transform control information may be performed.

By doing so, the LFNST identifier decoding unit 201 can control decoding of the LFNST identifier according to the tree type and the transform skip flag as in the table illustrated in FIG. 10. The control method in each tree type is as described above in <1. Signaling pattern of LFNST identifier>.

In any case of applying any method in the methods 1 to 4, in a case where the tree type is a dual tree chroma (DUAL TREE CHROMA) and the transform skip flags of both a Cb component and a Cr component of an image are true, the LFNST identifier decoding unit 201 can skip decoding of the LFNST identifier. Therefore, the decoding device 200 can suppress reduction in the encoding efficiency.

<Flow of Decoding Processing>

Figure 14:
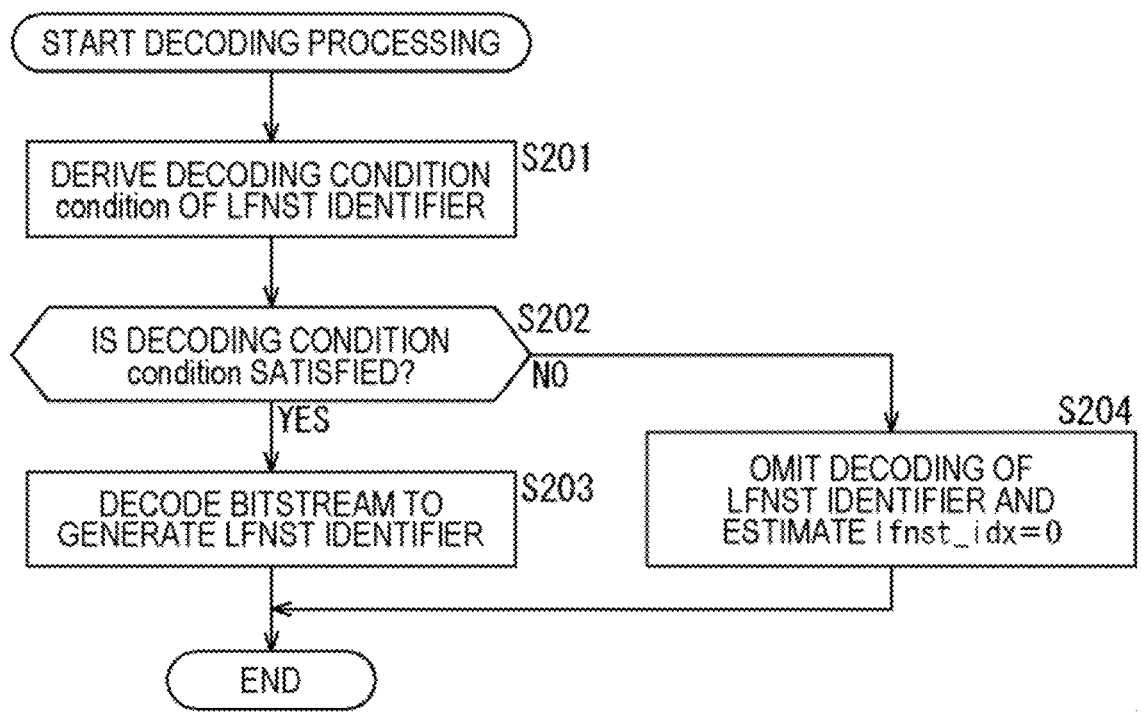
FIG. 14 is a flowchart for describing an example of a flow of decoding processing.

Next, an example of a flow of decoding processing executed in the decoding device 200 will be described with reference to the flowchart in FIG. 14.

When the decoding processing is started, the LFNST identifier decoding unit 201 of the decoding device 200 derives a decoding condition of the LFNST identifier in step S201. For example, in the case of applying the method 1 described in <1. Signaling pattern of LFNST identifier>, the LFNST identifier decoding unit 201 omits decoding related to secondary transform control information that is control information related to secondary transform in a case where a transform skip flag of at least one component among valid components in image decoding is true, and decodes the secondary transform control information in a case where the transform skip flags of all the components among the valid components in image decoding are false. For example, the LFNST identifier decoding unit 201 derives a variable NonTsUsed illustrated in FIG. 5, and derives the decoding condition condition illustrated in FIG. 5 using the derived variable NonTsUsed.

Note that the LFNST identifier decoding unit 201 may derive a variable TsUsed illustrated in FIG. 7 and derive the decoding condition illustrated in FIG. 7 using the derived variable TsUsed. Furthermore, the LFNST identifier decoding unit 201 may derive the decoding condition, applying any of the methods 2 to 4.

In step S202, the LFNST identifier decoding unit 201 determines whether or not the decoding condition condition is satisfied. That is, the LFNST identifier decoding unit 201 determines whether or not the decoding condition derived in step S201 is true. In a case where it is determined that the decoding condition condition is true, the processing proceeds to step S203.

In step S203, the LFNST identifier decoding unit 201 decodes the bitstream to generate the LFNST identifier (lfnst_idx). That is, in the case where the decoding condition is satisfied, the LFNST identifier decoding unit 201 decodes the bitstream to generate the LFNST identifier (lfnst_idx). When the processing in step S203 ends, the decoding processing ends.

Furthermore, in step S202, in a case where it is determined that the decoding condition derived in step S201 is false, the processing proceeds to step S204.

In step S204, the LFNST identifier decoding unit 201 skips (omits) decoding of the LFNST identifier (lfnst_idx). That is, in a case where the decoding condition is not satisfied, the LFNST identifier decoding unit 201 skips decoding of the LFNST identifier (lfnst_idx) and estimates that a value of the LFNST identifier is "0" (lfnst_idx=0). When the processing in step S204 ends, the decoding processing ends.

By executing the decoding processing in this manner, the LFNST identifier decoding unit 201 can skip decoding of the LFNST identifier when the tree type is a dual tree chroma (DUAL TREE CHROMA) and the transform skip flags of both a Cb component and a Cr component of an image are true, in any case of applying any method in the methods 1 to 4. Therefore, the decoding device 200 can suppress reduction in the encoding efficiency.

Supplement

Note that the decoding device 200 (LFNST identifier decoding unit 201) may decode an arbitrary secondary transform identifier (arbitrary secondary transform control information) instead of the example of the LFNST identifier. That is, inverse secondary transform is not limited to inverse processing of LFNST, and may be any inverse coefficient transform. Furthermore, some or all of the above-described methods 1 to 4 can be appropriately combined and applied.

4. Third Embodiment

<Image Encoding Device>

Figure 15:
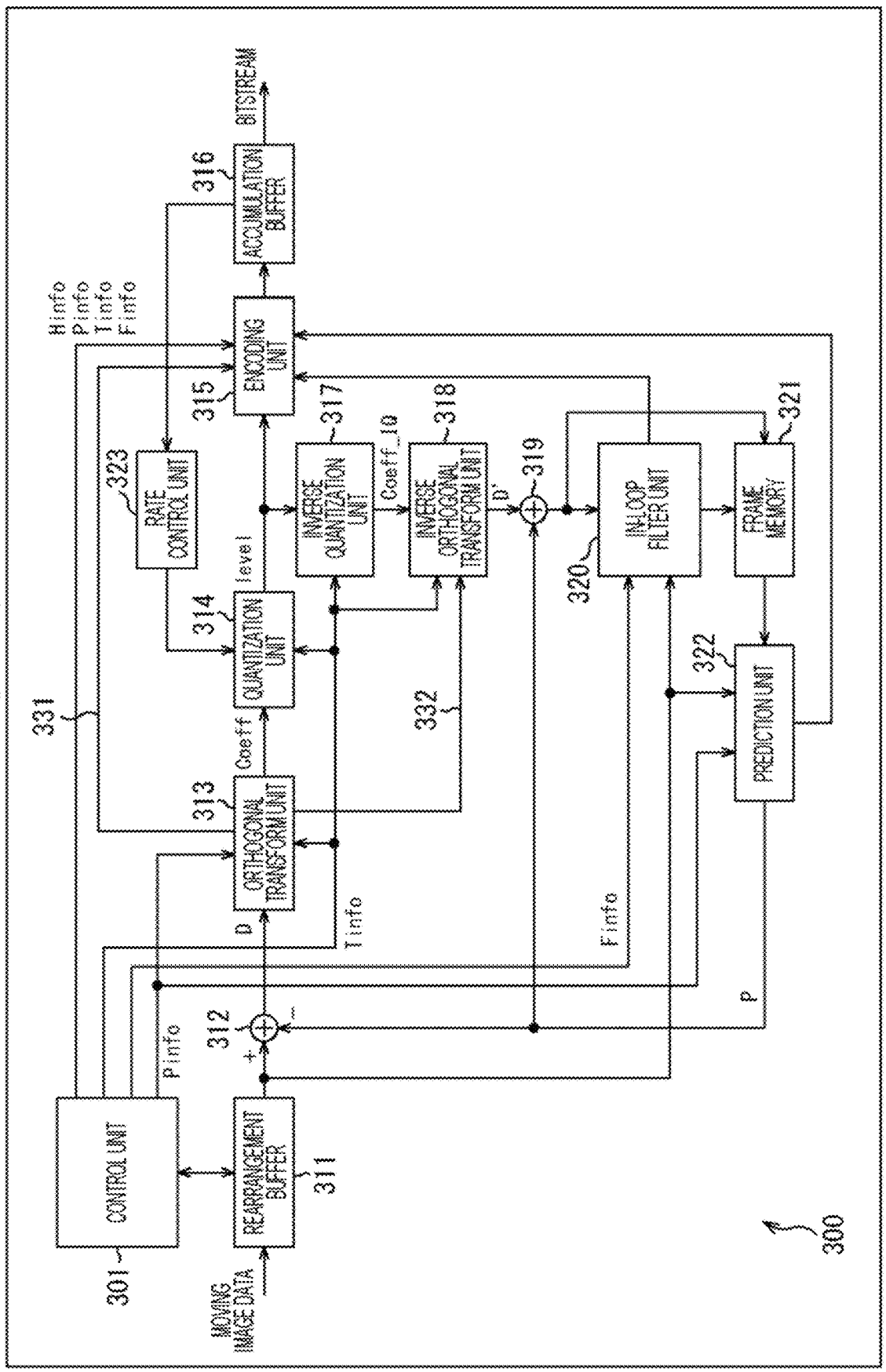
FIG. 15 is a block diagram illustrating a main configuration example of an image encoding device.

FIG. 15 is a block diagram illustrating an example of a configuration of an image encoding device that is one mode of an image processing device to which the present technology is applied. An image encoding device 300 illustrated in FIG. 15 is a device that encodes image data of a moving image. For example, the image encoding device 300 can encode image data of a moving image by the encoding method described in any one of Non-Patent Documents.

Note that FIG. 15 illustrates main processing units (blocks), data flows, and the like, and those illustrated in FIG. 15 are not necessarily everything. That is, in the image encoding device 300, there may be a processing unit not illustrated as a block in FIG. 15, or processing or data flow not illustrated as an arrow or the like in FIG. 15.

As illustrated in FIG. 15, the image encoding device 300 includes a control unit 301, a rearrangement buffer 311, a calculation unit 312, an orthogonal transform unit 313, a quantization unit 314, an encoding unit 315, an accumulation buffer 316, an inverse quantization unit 317, an inverse orthogonal transform unit 318, a calculation unit 319, an in-loop filter unit 320, a frame memory 321, a prediction unit 322, and a rate control unit 323.

<Control Unit>

The control unit 301 divides moving image data held by the rearrangement buffer 311 into blocks (CUs, PUs, transform blocks, or the like) in units of processing on the basis of a block size in external or pre-designated units of processing. Furthermore, the control unit 301 determines encoding parameters (header information Hinfo, prediction mode information Pinfo, transform information Tinfo, filter information Finfo, and the like) to be supplied to each block on the basis of, for example, rate-distortion optimization (RDO).

Details of these encoding parameters will be described below. After determining the above-described encoding parameters, the control unit 301 supplies the encoding parameters to each block. Specifically, the encoding parameters are as follows.

The header information Hinfo is supplied to each block.

The prediction mode information Pinfo is supplied to the encoding unit 315 and the prediction unit 322.

The transform information Tinfo is supplied to the encoding unit 315, the orthogonal transform unit 313, the quantization unit 314, the inverse quantization unit 317, and the inverse orthogonal transform unit 318.

The filter information Finfo is supplied to the in-loop filter unit 320.

<Rearrangement Buffer>

Each field (input image) of moving image data is input to the image encoding device 300 in reproduction order (display order). The rearrangement buffer 311 acquires and holds (stores) each input image in its reproduction order (display order). The rearrangement buffer 311 rearranges the input images in encoding order (decoding order) or divides the input images into blocks in units of processing on the basis of the control of the control unit 301. The rearrangement buffer 311 supplies the processed input image to the calculation unit 312. Furthermore, the rearrangement buffer 311 also supplies the input images (original images) to the prediction unit 322 and the in-loop filter unit 320.

<Calculation Unit>

The calculation unit 312 receives an image I corresponding to the block in units of processing and a predicted image P supplied from the prediction unit 322 as inputs, subtracts the predicted image P from the image I as illustrated in the following expression to derive a prediction residual D, and supplies the prediction residual D to the orthogonal transform unit 313.

$$D=I-P$$

<Orthogonal Transform Unit>

The orthogonal transform unit 313 performs processing regarding coefficient transform. For example, the orthogonal transform unit 313 acquires the prediction residual D supplied from the calculation unit 312. Furthermore, the orthogonal transform unit 313 acquires the transform information Tinfo supplied from the control unit 301.

The orthogonal transform unit 313 performs orthogonal transform for the prediction residual D on the basis of the transform information Tinfo to derive a transform coefficient Coeff. For example, the orthogonal transform unit 313 performs primary transform for the prediction residual D to generate a primary transform coefficient, and performs secondary transform for the primary transform coefficient to generate a secondary transform coefficient. The orthogonal transform unit 313 supplies the obtained secondary transform coefficient to the quantization unit 314 as the transform coefficient Coeff.

Note that the orthogonal transform is an example of coefficient transform, and is not limited to this example. That is, the orthogonal transform unit 313 can perform arbitrary coefficient transform for the prediction residual D. In addition, the orthogonal transform unit 313 can perform arbitrary coefficient transform as primary transform and secondary transform.

<Quantization Unit>

The quantization unit 314 performs processing regarding quantization. For example, the quantization unit 314 acquires the transform coefficient Coeff supplied from the orthogonal transform unit 313. Furthermore, the quantization unit 314 acquires the transform information Tinfo supplied from the control unit 301. Moreover, the quantization unit 314 scales (quantizes) the transform coefficient Coeff on the basis of the transform information Tinfo. Note that this quantization method is arbitrary. Furthermore, a rate of this quantization is controlled by the rate control unit 323. The quantization unit 314 supplies a quantized transform coefficient obtained by the quantization, that is, a quantized transform coefficient level to the encoding unit 315 and the inverse quantization unit 317.

<Encoding Unit>

The encoding unit 315 performs processing regarding encoding. For example, the encoding unit 315 acquires the quantized transform coefficient level supplied from the quantization unit 314. Furthermore, the encoding unit 315 acquires various encoding parameters (header information Hinfo, prediction mode information Pinfo, transform information Tinfo, filter information Finfo, and the like) supplied from the control unit 301. Moreover, the encoding unit 315 acquires information regarding a filter such as a filter coefficient supplied from the in-loop filter unit 320. Furthermore, the encoding unit 315 acquires information regarding an optimum prediction mode supplied from the prediction unit 322.

The encoding unit 315 performs variable-length coding (for example, arithmetic encoding) for the quantized transform coefficient level to generate a bit string (coded data). Furthermore, the encoding unit 315 derives residual information Rinfo from the quantized transform coefficient level, and encodes the residual information Rinfo to generate a bit string.

The encoding unit 315 includes the information regarding a filter supplied from the in-loop filter unit 320 in the filter information Finfo. Furthermore, the encoding unit 315 includes the information regarding an optimum prediction mode supplied from the prediction unit 322 in the prediction mode information Pinfo. Then, the encoding unit 315 encodes the above-described various encoding parameters (header information Hinfo, prediction mode information Pinfo, transform information Tinfo, filter information Finfo, and the like) to generate a bit string.

The encoding unit 315 multiplexes the bit string of the various types of information generated as described above to generate coded data. The encoding unit 315 supplies the coded data to the accumulation buffer 316.

<Accumulation Buffer>

The accumulation buffer 316 temporarily stores the coded data obtained by the encoding unit 315. The accumulation buffer 316 outputs the stored coded data to an outside of the image encoding device 300 as a bitstream or the like at predetermined timing. For example, the coded data is transmitted to a decoding side via an arbitrary recording medium, an arbitrary transmission medium, an arbitrary information processing device, or the like. That is, the accumulation buffer 316 is also a transmission unit that transmits coded data (bitstream).

<Inverse Quantization Unit>

The inverse quantization unit 317 performs processing regarding inverse quantization. For example, the inverse quantization unit 317 acquires the quantized transform coefficient level supplied from the quantization unit 314. Furthermore, the inverse quantization unit 317 acquires the transform information Tinfo supplied from the control unit 301.

The inverse quantization unit 317 scales (inversely quantizes) a value of the quantized transform coefficient level on the basis of the transform information Tinfo. Note that the inverse quantization is inverse processing of the quantization performed in the quantization unit 314. The inverse quantization unit 317 supplies a transform coefficient Coeff_IQ obtained by the inverse quantization to the inverse orthogonal transform unit 318.

<Inverse Orthogonal Transform Unit>

The inverse orthogonal transform unit 318 performs processing regarding inverse coefficient transform. For example, the inverse orthogonal transform unit 318 acquires the transform coefficient Coeff_IQ supplied from the inverse quantization unit 317. Furthermore, the inverse orthogonal transform unit 318 acquires the transform information Tinfo supplied from the control unit 301.

The inverse orthogonal transform unit 318 performs inverse orthogonal transform for the transform coefficient Coeff_IQ on the basis of the transform information Tinfo to derive a prediction residual D'. Note that the inverse orthogonal transform is inverse processing of the orthogonal transform performed in the orthogonal transform unit 313. For example, the inverse orthogonal transform unit 318 performs inverse secondary transform for the transform coefficient Coeff_IQ (secondary transform coefficient) to generate a primary transform coefficient. Furthermore, the inverse orthogonal transform unit 318 performs inverse primary transform for the primary transform coefficient to generate the prediction residual D'. Note that the inverse secondary transform is inverse processing of the secondary transform performed by the orthogonal transform unit 313. Furthermore, the inverse primary transform is inverse processing of the primary transform performed in the orthogonal transform unit 313.

The inverse orthogonal transform unit 318 supplies the prediction residual D' obtained by the inverse orthogonal transform to the calculation unit 319. Note that, since the inverse orthogonal transform unit 318 is similar to an inverse orthogonal transform unit on the decoding side (to be described below), description to be given (to be described below) for the decoding side can be applied to the inverse orthogonal transform unit 318.

<Calculation Unit>

The calculation unit 319 uses the prediction residual D' supplied from the inverse orthogonal transform unit 318 and the predicted image P supplied from the prediction unit 322 as inputs. The calculation unit 319 adds the prediction residual D' and the predicted image P corresponding to the prediction residual D' to derive a locally decoded image Rlocal. The calculation unit 319 supplies the derived locally decoded image Rlocal to the in-loop filter unit 320 and the frame memory 321.

<In-Loop Filter Unit>

The in-loop filter unit 320 performs processing regarding in-loop filter processing. For example, the in-loop filter unit 320 uses the locally decoded image Rlocal supplied from the calculation unit 319, the filter information Finfo supplied from the control unit 301, and the input image (original image) supplied from the rearrangement buffer 311 as inputs. Note that the information input to the in-loop filter unit 320 is arbitrary, and information other than the aforementioned information may be input. For example, information such as the prediction mode, motion information, a code amount target value, a quantization parameter QP, a picture type, and a block (a CU, a CTU, or the like), and the like may be input to the in-loop filter unit 320, as necessary.

The in-loop filter unit 320 appropriately performs filtering processing for the locally decoded image Rlocal on the basis of the filter information Finfo. The in-loop filter unit 320 also uses the input image (original image) and other input information for the filtering processing as necessary.

For example, the in-loop filter unit 320 applies four in-loop filters of a bilateral filter, a deblocking filter (DBF), an adaptive offset filter (sample adaptive offset (SAO)), and an adaptive loop filter (ALF) in this order. Note that which filter is applied and in which order the filters are applied are arbitrary and can be selected as appropriate.

Of course, the filtering processing performed by the in-loop filter unit 320 is arbitrary, and is not limited to the above example. For example, the in-loop filter unit 320 may apply a Wiener filter or the like.

The in-loop filter unit 320 supplies the filtered locally decoded image Rlocal to the frame memory 321. Note that, in a case of transmitting the information regarding filters such as filter coefficients to the decoding side, the in-loop filter unit 320 supplies the information regarding filters to the encoding unit 315.

<Frame Memory>

The frame memory 321 performs processing regarding storage of data relating to an image. For example, the frame memory 321 uses the locally decoded image Rlocal supplied from the calculation unit 319 and the filtered locally decoded image Rlocal supplied from the in-loop filter unit 320 as inputs, and holds (stores) the inputs. Furthermore, the frame memory 321 reconstructs and holds a decoded image R for each picture unit, using the locally decoded image Rlocal (stores the decoded image R in a buffer in the frame memory 321). The frame memory 321 supplies the decoded image R (or a part thereof) to the prediction unit 322 in response to a request from the prediction unit 322.

<Prediction Unit>

The prediction unit 322 performs processing regarding generation of a predicted image. For example, the prediction unit 322 acquires the prediction mode information Pinfo supplied from the control unit 301. Furthermore, the prediction unit 322 acquires the input image (original image) supplied from the rearrangement buffer 311. Further, the prediction unit 322 acquires the decoded image R (or a part thereof) read from frame memory 321.

The prediction unit 322 performs prediction processing such as inter prediction or intra prediction using the prediction mode information Pinfo and the input image (original image). That is, the prediction unit 322 performs prediction with reference to the decoded image R as a reference image, performs motion compensation processing on the basis of a prediction result, and generates a predicted image P.

The prediction unit 322 supplies the generated predicted image P to the calculation units 312 and 319. Furthermore, the prediction unit 322 supplies a prediction mode selected by the above processing, that is, the information regarding an optimal prediction mode to the encoding unit 315, as necessary.

<Rate Control Unit>

The rate control unit 323 performs processing regarding rate control. For example, the rate control unit 323 controls a rate of a quantization operation of the quantization unit 314 so that an overflow or an underflow does not occur on the basis of the code amount of the coded data accumulated in the accumulation buffer 316.

<Encoding Control of LFNST Identifier>

The present technology described in <1. Signaling pattern of LFNST identifier> can be applied to the image encoding device 300 having the above configuration.

For example, the orthogonal transform unit 313 performs LFNST as the secondary transform, and supplies the LFNST identifier (lfnst_idx) as the secondary transform control information (secondary transform identifier) to the encoding unit 315 (arrow 331). Note that the orthogonal transform unit 313 also supplies the LFNST identifier (lfnst_idx) to the inverse orthogonal transform unit 318 (arrow 332).

The encoding unit 315 includes an LFNST identifier encoding unit 101 of the encoding device 100 (FIG. 11). The LFNST identifier encoding unit 101 acquires the LFNST identifier supplied from the orthogonal transform unit 313. The LFNST identifier encoding unit 101 encodes the acquired LFNST identifier to generate a bit string. The encoding unit 315 multiplexes the generated bit string with a bit string of another information to generate coded data. The encoding unit 315 supplies the coded data to the accumulation buffer 316.

Furthermore, the LFNST identifier encoding unit 101 acquires various parameters to be used for controlling encoding of the LFNST identifier as illustrated in FIG. 11, which are supplied as the transform information Tinfo from the control unit 301. For example, the LFNST identifier encoding unit 101 acquires parameters such as treeType, transform_skip_flag[0], transform_skip_flag[1], transform_skip_flag[2], lfnstWidth, lfnstHeight, sps_lfnst_enabled_flag, intra_mip_flag, cbWidth, cbHeight, IntraSubPartitionSplitType, LfnstDcOnly, and LfnstZeroOutSigCoefFlag. These parameters are parameters described in Non-Patent Document described above (for example, Non-Patent Document 1).

Then, the LFNST identifier encoding unit 101 (that is, the encoding unit 315) controls the encoding (signaling) of the LFNST identifier (lfnst_idx) as described in <1. Signaling pattern of LFNST identifier> using these parameters.

For example, the encoding unit 315 controls the encoding of the LFNST identifier by applying the above-described method 1. That is, the encoding unit 315 omits encoding of secondary transform control information that is control information related to secondary transform is omitted in a case where a transform skip flag of at least one component among valid components in image encoding is true, and encodes the secondary transform control information in a case where the transform skip flags of all the components among the valid components in image encoding are false.

For example, the encoding unit 315 controls encoding of the LFNST identifier according to the syntax table illustrated in FIG. 4. Note that the encoding unit 315 may control encoding of the LFNST identifier according to the syntax table illustrated in FIG. 6. According to these syntax tables, the encoding unit 315 can control encoding of the LFNST identifier according to the tree type and the transform skip flag as in the table illustrated in FIG. 3. The control method in each tree type is as described above in <1. Signaling pattern of LFNST identifier>.

Note that the encoding unit 315 may control the encoding of the LFNST identifier by applying the above-described method 2. That is, the encoding unit 315 may omit the encoding of the secondary transform control information in a case where the transform skip flags of all the components among the valid components in image encoding are true, and encode the secondary transform control information in a case where the transform skip flag of at least one component among the valid components in image encoding is false.

By doing so, the encoding unit 315 can control encoding of the LFNST identifier according to the tree type and the transform skip flag as in the table illustrated in FIG. 8. The control method in each tree type is as described above in <1. Signaling pattern of LFNST identifier>.

Furthermore, the encoding unit 315 may control the encoding of the LFNST identifier by applying the above-described method 3. For example, in a case where a tree type of the image encoding is a dual tree chroma, and the encoding unit 315 may omit the encoding of the secondary transform control information in a case where the transform skip flags of all of components among valid components in the dual tree chroma are true, and encode the secondary transform control information in a case where the transform skip flag of at least one component among the valid components in the dual tree chroma is false.

By doing so, the encoding unit 315 can control encoding of the LFNST identifier according to the tree type and the transform skip flag as in the table illustrated in FIG. 9. The control method in each tree type is as described above in <1. Signaling pattern of LFNST identifier>.

Furthermore, the encoding unit 315 may control the encoding of the LFNST identifier by applying the above-described method 4. For example, in a case where a tree type of the image encoding is a dual tree chroma, and the encoding unit 315 may omit the encoding of the secondary transform control information in a case where the transform skip flag of at least one component among valid components in the dual tree chroma is true, and encode the secondary transform control information in a case where the transform skip flags of all the components among the valid components in the dual tree chroma are false.

By doing so, the encoding unit 315 can control encoding of the LFNST identifier according to the tree type and the transform skip flag as in the table illustrated in FIG. 10. The control method in each tree type is as described above in <1. Signaling pattern of LFNST identifier>.

In any case of applying any method in the methods 1 to 4, in a case where the tree type is a dual tree chroma (DUAL_TREE_CHROMA) and the transform skip flags of both the Cb component and the Cr component of an image are true, the encoding unit 315 can skip signaling of the LFNST identifier. Therefore, the image encoding device 300 can suppress reduction in the encoding efficiency.

Configuration Example

Note that these processing units (the control unit 301, and the rearrangement buffer 311 to the rate control unit 323) have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Flow of Image Encoding Processing>

Figure 16:
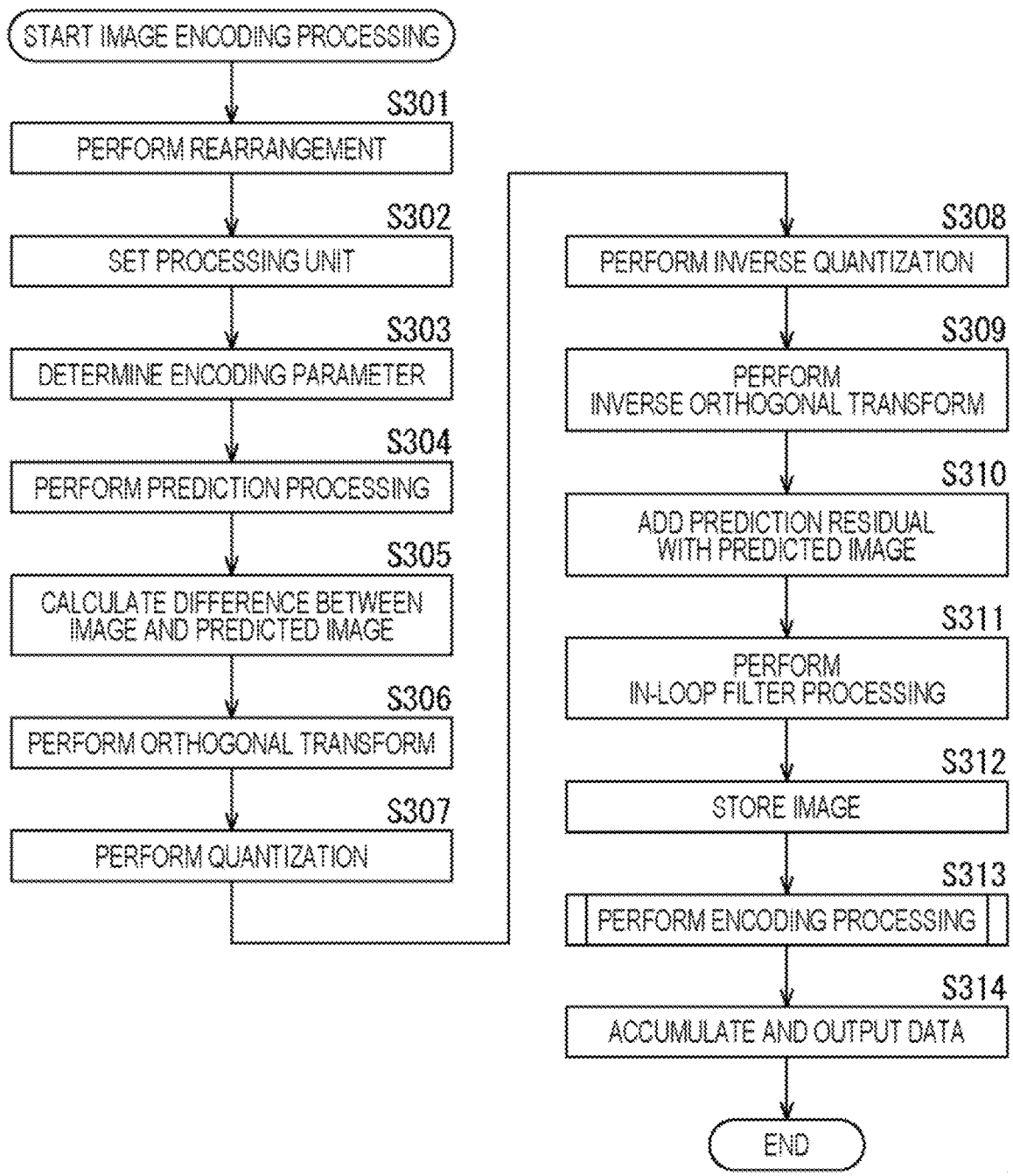
FIG. 16 is a flowchart for describing an example of a flow of image encoding processing.

Next, an example of a flow of image encoding processing executed by the image encoding device 300 having the above configuration will be described with reference to a flowchart of FIG. 16.

When the image encoding processing is started, in step S301, the rearrangement buffer 311 is controlled by the control unit 301 and rearranges frames of input moving image data from the display order to the encoding order.

In step S302, the control unit 301 sets the unit of processing (performs block division) for an input image held by the rearrangement buffer 311.

In step S303, the control unit 301 determines (sets) an encoding parameter for the input image held by the rearrangement buffer 311.

In step S304, the prediction unit 322 performs the prediction processing and generates a predicted image or the like in the optimal prediction mode. For example, in the prediction processing, the prediction unit 322 performs the intra prediction to generate a predicted image in an optimal intra prediction mode, performs the inter prediction to generate a predicted image in an optimal inter prediction mode, and selects an optimal prediction mode from among the predicted images on the basis of a cost function value and the like.

In step S305, the calculation unit 312 calculates a difference between the input image and the predicted image in the optimal mode selected by the prediction processing in step S304. That is, the calculation unit 312 generates the prediction residual D between the input image and the predicted image. The prediction residual D obtained in this way is reduced in the data amount as compared with the original image data. Therefore, the data amount can be compressed as compared with a case of encoding the image as it is.

In step S306, the orthogonal transform unit 313 performs orthogonal transform processing for the prediction residual D generated by the processing in step S305 to derive the transform coefficient Coeff. For example, the orthogonal transform unit 313 performs the primary transform for the prediction residual D to generate a primary transform coefficient, and performs the secondary transform for the primary transform coefficient to generate a secondary transform coefficient (transform coefficient Coeff).

In step S307, the quantization unit 314 quantizes the transform coefficient Coeff obtained by the processing in step S306 by using a quantization parameter calculated by the control unit 301 or the like to derive the quantized transform coefficient level.

In step S308, the inverse quantization unit 317 inversely quantizes the quantized transform coefficient level generated by the processing in step S307 with characteristics corresponding to the characteristics of the quantization in step S307 to derive the transform coefficient Coeff IQ.

In step S309, the inverse orthogonal transform unit 318 inversely orthogonally transforms the transform coefficient Coeff_IQ obtained by the processing in step S308 by a method corresponding to the orthogonal transform processing in step S306 to derive the prediction residual D'. For example, the inverse orthogonal transform unit 318 performs inverse secondary transform for the transform coefficient Coeff_IQ (secondary transform coefficient) to generate a primary transform coefficient. Furthermore, the inverse orthogonal transform unit 318 performs inverse primary transform for the primary transform coefficient to generate the prediction residual D'.

Note that this inverse orthogonal transform processing is similar to the inverse orthogonal transform processing performed on the decoding side. Therefore, the description of the decoding side to be described below can be applied to the inverse orthogonal transform processing of step S309.

In step S310, the calculation unit 319 adds the predicted image obtained by the prediction processing in step S304 to the prediction residual D' derived by the processing in step S309 to generate a locally decoded image.

In step S311, the in-loop filter unit 320 performs the in-loop filter processing for the locally decoded image derived by the processing in step S310.

In step S312, the frame memory 321 stores the locally decoded image derived by the processing in step S310 and the locally decoded image filtered in step S311.

In step S313, the encoding unit 315 encodes the quantized transform coefficient level obtained by the processing in step S307. For example, the encoding unit 315 encodes the quantized transform coefficient level that is information regarding the image by arithmetic encoding or the like to generate the coded data. Furthermore, at this time, the encoding unit 315 encodes the various encoding parameters (header information Hinfo, prediction mode information Pinfo, and transform information Tinfo). Moreover, the encoding unit 315 derives the residual information RInfo from the quantized transform coefficient level and encodes the residual information RInfo.

In step S314, the accumulation buffer 316 accumulates the coded data thus obtained, and outputs the coded data to the outside of the image encoding device 300, for example, as a bitstream. The bitstream is transmitted to the decoding side via a transmission path or a recording medium, for example. Furthermore, the rate control unit 323 performs rate control as necessary.

When the processing in step S314 ends, the image encoding processing ends.

<Encoding Control of LFNST Identifier>

The present technology described in <1. Signaling pattern of LFNST identifier> can be applied to the image encoding processing having the above flow.

For example, in step S306, the orthogonal transform unit 313 performs LFNST as the secondary transform. The orthogonal transform unit 313 generates an LFNST identifier (lfnst_idx) as the secondary transform control information (secondary transform identifier) for the secondary transform (LFNST).

In step S313, (the LFNST identifier encoding unit 101 of) the encoding unit 315 encodes the LFNST identifier. At that time, the encoding unit 315 controls encoding of the LFNST identifier on the basis of the transform information Tinfo. That is, the encoding unit 315 performs the encoding processing illustrated in the flowchart of FIG. 12 as one of the processing of step S313.

For example, in step S101, the encoding unit 315 derives the encoding condition of the LFNST identifier on the basis of the above-described various parameters included in the transform information Tinfo. In step S102, the encoding unit 315 determines whether or not the encoding condition is satisfied. In a case where it is determined that the encoding condition condition is true, the encoding unit 315 encodes the LFNST identifier to generate a bit string in step S103. The encoding unit 315 multiplexes the generated bit string with a bit string of another information to generate coded data. That is, in this case, the LFNST identifier is signaled.

Furthermore, in step S102, in a case where it is determined that the encoding condition derived in step S101 is false, the encoding unit 315 skips (omits) encoding of the LFNST identifier in step S104. That is, in this case, the bit string of the LFNST identifier is not generated. That is, the LFNST identifier is not signaled.

In the encoding processing as described above, (the LFNST identifier encoding unit 101 of) the encoding unit 315 applies, for example, the method 1 described above in <1. Signaling pattern of LFNST identifier>. That is, the encoding unit 315 omits encoding of secondary transform control information that is control information related to secondary transform is omitted in a case where a transform skip flag of at least one component among valid components in image encoding is true, and encodes the secondary transform control information in a case where the transform skip flags of all the components among the valid components in image encoding are false.

In that case, in step S101, the encoding unit 315 derives the variable NonTsUsed illustrated in FIG. 5, and derives the encoding condition illustrated in FIG. 5 using the derived variable NonTsUsed. Note that the encoding unit 315 may derive the variable TsUsed illustrated in FIG. 7 and derive the encoding condition condition illustrated in FIG. 7 using the derived variable TsUsed. Furthermore, the encoding unit 315 may derive the encoding condition, applying any of the methods 2 to 4.

By executing the image encoding processing in this manner, the encoding unit 315 can skip signaling of the LFNST identifier when the tree type is a dual tree chroma (DUAL_TREE_CHROMA) and the transform skip flags of both the Cb component and the Cr component of an image are true, in any case of applying any method in the methods 1 to 4. Therefore, the image encoding device 300 can suppress reduction in the encoding efficiency.

Supplement

Note that the image encoding device 300 can apply an arbitrary coefficient transform as the secondary transform. Therefore, the encoding unit 315 can encode an arbitrary secondary transform identifier (arbitrary secondary transform control information) instead of the example of the LFNST identifier. Furthermore, some or all of the above-described methods 1 to 4 can be appropriately combined and applied.

5. Fourth Embodiment

<Image Decoding Device>

Figure 17:
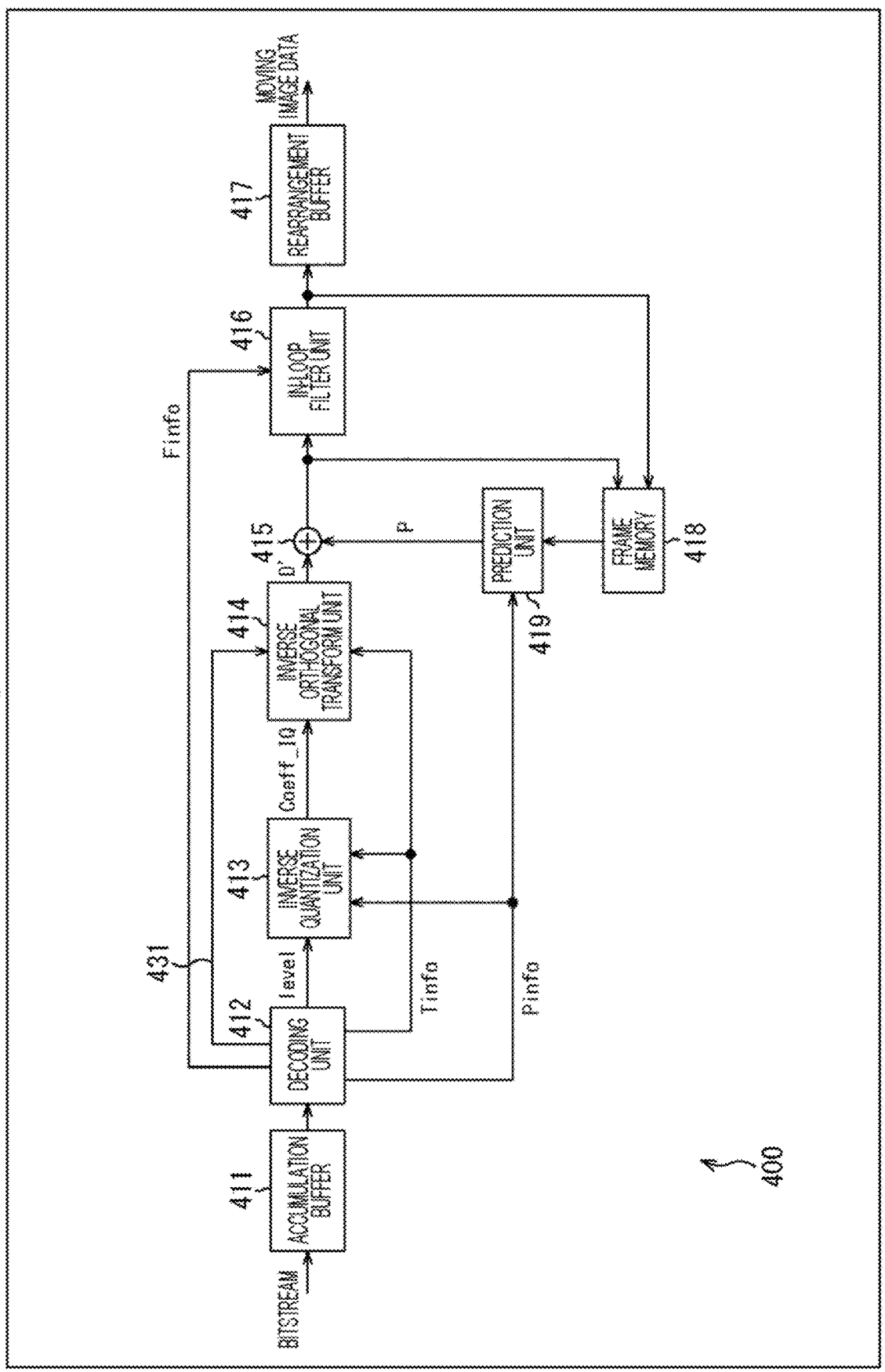
FIG. 17 is a block diagram illustrating a main configuration example of an image decoding device.

FIG. 17 is a block diagram illustrating an example of a configuration of an image decoding device as one mode of an image processing device to which the present technology is applied. An image decoding device 400 illustrated in FIG. 17 is a device that encodes coded data of a moving image. For example, the image decoding device 400 can decode the coded data by a decoding method described in any one of the above Non-Patent Documents. For example, the image decoding device 400 decodes the coded data (bitstream) generated by the above-described image encoding device 300.

Note that FIG. 17 illustrates main processing units (blocks), data flows, and the like, and those illustrated in FIG. 17 are not necessarily everything. That is, in the image decoding device 400, there may be a processing unit not illustrated as a block in FIG. 17, or processing or data flow not illustrated as an arrow or the like in FIG. 17.

In FIG. 17, the image decoding device 400 includes an accumulation buffer 411, a decoding unit 412, an inverse quantization unit 413, an inverse orthogonal transform unit 414, a calculation unit 415, an in-loop filter unit 416, a rearrangement buffer 417, a frame memory 418, and a prediction unit 419. Note that the prediction unit 419 includes an intra prediction unit and an inter prediction unit (not illustrated). The image decoding device 400 is a device for generating moving image data by decoding coded data (bitstream).

<Accumulation Buffer>

The accumulation buffer 411 acquires the bitstream input to the image decoding device 400 and holds (stores) the bitstream. The accumulation buffer 411 supplies the accumulated bitstream to the decoding unit 412 at predetermined timing or in a case where a predetermined condition is satisfied, for example.

<Decoding Unit>

The decoding unit 412 performs processing for decoding an image. For example, the decoding unit 412 acquires the bitstream supplied from the accumulation buffer 411. For example, the decoding unit 412 performs variable length decoding for a syntax value of each syntax element from a bit string according to a definition of a syntax table to derive a parameter.

The parameter derived from the syntax element and the syntax value of the syntax element includes, for example, information such as header information Hinfo, prediction mode information Pinfo, transform information Tinfo, residual information Rinfo, and filter information Finfo. That is, the decoding unit 412 parses (analyzes and acquires) such information from the bitstream. These pieces of information will be described below.

<Header Information Hinfo>

The header information Hinfo includes, for example, header information such as a video parameter set (VPS)/a sequence parameter set (SPS)/a picture parameter set (PPS)/a slice header (SH). The header information Hinfo includes, for example, information defining image size (width PicWidth and height PicHeight), bit depth (luminance bitDepthY and chrominance bitDepthC), chrominance array type ChromaArrayType, CU size maximum value MaxCUSize/minimum value MinCUSize, maximum depth MaxQTDepth/minimum depth MinQTDepth of quad-tree division, maximum depth MaxBTDepth/minimum depth MinBTDepth of binary-tree division, a maximum value MaxTSSize of a transform skip block (also called maximum transform skip block size), an on/off flag of each encoding tool (also called enabled flag), and the like.

For example, an example of the on/off flag of the encoding tool included in the header information Hinfo includes an on/off flag related to transform and quantization processing below. Note that the on/off flag of the encoding tool can also be interpreted as a flag indicating whether or not a syntax related to the encoding tool exists in the coded data. Furthermore, in a case where a value of the on/off flag is 1 (true), the value indicates that the encoding tool is available. In a case where the value of the on/off flag is 0 (false), the value indicates that the encoding tool is not available. Note that the interpretation of the flag value may be reversed.

For example, the header information Hinfo may include an inter-component prediction enabled flag (ccp_enabled_flag). The inter-component prediction enabled flag is flag information indicating whether or not inter-component prediction (cross-component prediction (CCP), also referred to as CC prediction) is available. For example, in a case where the flag information is "1" (true), the flag information indicates that the inter-component prediction is available. In a case where the flag information is "0" (false), the flag information indicates that the inter-component prediction is not available.

Note that this CCP is also referred to as inter-component linear prediction (CCLM or CCLMP).

<Prediction Mode Information Pinfo>

The prediction mode information Pinfo includes, for example, information such as size information PBSize (prediction block size) of a prediction block (PB) to be processed, intra prediction mode information IPinfo, and motion prediction information MVinfo.

The intra prediction mode information IPinfo includes, for example, prev_intra_luma_pred_flag, mpm_idx, and rem_intra_pred_mode in JCTVC-W1005, 7.3.8.5 Coding Unit syntax, a luminance intra prediction mode IntraPredModeY derived from the syntax, and the like.

Furthermore, the intra prediction mode information IPinfo may include, for example, an inter-component prediction flag (ccp_flag (cclmp_flag)). The inter-component prediction flag (ccp_flag (cclmp_flag)) is flag information indicating whether or not to apply inter-component linear prediction. For example, ccp_flag==1 indicates that inter-component prediction is applied, and ccp_flag==0 indicates that the inter-component prediction is not applied.

Furthermore, the intra prediction mode information IPinfo may include a multi-class linear prediction mode flag (mclm_flag). The multi-class linear prediction mode flag (mclm_flag) is information regarding a linear prediction mode (linear prediction mode information). More specifically, the multi-class linear prediction mode flag (mclm_flag) is flag information indicating whether or not to set a multi-class linear prediction mode. For example, "0" indicates one-class mode (single class mode) (for example, CCLMP), and "1" indicates two-class mode (multi-class mode) (for example, MCLMP).

Moreover, the intra prediction mode information IPinfo may include a chrominance sample position type identifier (chroma_sample_loc_type_idx). The chrominance sample position type identifier (chroma_sample_loc_type_idx) is an identifier for identifying a type of a pixel position of a chrominance component (also referred to as a chrominance sample position type). For example, in a case where the chrominance array type (ChromaArrayType), which is information regarding a color format, indicates 420 format, the chrominance sample position type identifier is assigned as in the following expression.

chroma_sample_loc_type_idx==0:Type2
chroma_sample_loc_type_idx==1:Type3
chroma_sample_loc_type_idx==2:Type0
chroma_sample_loc_type_idx==3:Type1

Note that the chrominance sample position type identifier (chroma_sample_loc_type_idx) is transmitted as (by being stored in) information (chroma_sample_loc_info ( )) regarding the pixel position of the chrominance component (that is, stored in information regarding the pixel position of the chrominance component).

Furthermore, the intra prediction mode information IPinfo may include a chrominance MPM identifier (chroma_mpm_idx). The chrominance MPM identifier (chroma_mpm_idx) is an identifier indicating which prediction mode candidate in a chrominance intra prediction mode candidate list (intraPredModeCandListC) is to be specified as a chrominance intra prediction mode.

Moreover, the intra prediction mode information IPinfo may include a luminance intra prediction mode (IntraPredModeC) derived from these syntaxes.

The motion prediction information MVinfo includes, for example, information such as merge_idx, merge_flag, inter_pred_idc, ref_idx_LX, mvp_lX_flag, X={0,1}, mvd, and the like (see, for example, JCTVC-W1005, 7.3.8.6 Prediction Unit Syntax).

Of course, the information included in the prediction mode information Pinfo is arbitrary, and information other than the above information may be included.

<Transform Information Tinfo>

The transform information Tinfo may include, for example, a width size TBWSize and a height TBHSize of a transform block to be processed. Note that a logarithmic value log 2TBWSize having a base of 2 may be applied instead of the width size TBWSize of the transform block to be processed. Furthermore, a logarithmic value log 2TBHSize having a base of 2 may be applied instead of the height TBHSize of the transform block to be processed.

Furthermore, the transform information Tinfo may include a transform skip flag (transform_skip_flag (or ts_flag)). The transform skip flag is a flag indicating whether or not to skip the coefficient transform (or inverse coefficient transform). Note that this transform skip flag may be signaled for each component of Y, Cb, and Cr (transform_skip_flag[0], transform_skip_flag[1], and transform_skip_flag[2]).

Moreover, the transform information Tinfo may include parameters such as a scan identifier (scanIdx), a quantization parameter (qp), and a quantization matrix (scaling_matrix (for example, JCTVC-W1005, 7.3.4 Scaling list data syntax)).

Of course, the information included in the transform information Tinfo is arbitrary, and information other than the above information may be included:

<Residual Information Rinfo>

The residual information Rinfo (see, for example, 7.3.8.11 Residual Coding syntax of JCTVC-W1005) may include, for example, a residual data presence/absence flag (cbf (coded_block_flag)). Furthermore, the residual information Rinfo may include last non-zero coefficient X coordinate (last_sig_coeff_x_pos) and last non-zero coefficient Y coordinate (last_sig_coeff_y_pos). Moreover, the residual information Rinfo may include a subblock non-zero coefficient presence/absence flag (coded_sub_block_flag) and a non-zero coefficient presence/absence flag (sig_coeff_flag).

Furthermore, the residual information Rinfo may include a GR1 flag (gr1_flag) that is a flag indicating whether the level of the non-zero coefficient is greater than 1, and a GR2 flag (gr2_flag) that is a flag indicating whether the level of the non-zero coefficient is greater than 2. Moreover, the residual information Rinfo may include a sign code (sign_flag) that is a sign indicating positive or negative of the non-zero coefficient. Furthermore, the residual information Rinfo may include a non-zero coefficient residual level (coeff_abs_level_remaining) that is a residual level of the non-zero coefficient.

Of course, the information included in the residual information Rinfo is arbitrary, and information other than the above information may be included.

<Filter Information Finfo>

The filter information Finfo includes control information regarding filter processing. For example, the filter information Finfo may include control information regarding a deblocking filter (DBF). Furthermore, the filter information Finfo may include control information regarding a pixel-adaptive offset (SAO). Moreover, the filter information Finfo may include control information regarding an adaptive loop filter (ALF). Furthermore, the filter information Finfo may include control information regarding other linear and nonlinear filters.

For example, the filter information Finfo may include a picture to which each filter is applied and information specifying a region in the picture. Furthermore, the filter information Finfo may include filter On/Off control information in units of CUs. Moreover, the filter information Finfo may include filter On/Off control information regarding a boundary of a slice or a tile.

Of course, the information included in the filter information Finfo is arbitrary, and information other than the above information may be included.

Return to the description of the decoding unit 412. The decoding unit 412 refers to the residual information Rinfo and derives a quantized transform coefficient level at each coefficient position in each transform block. The decoding unit 412 supplies the quantized transform coefficient level to the inverse quantization unit 413.

Furthermore, the decoding unit 412 supplies the parsed header information Hinfo, prediction mode information Pinfo, quantized transform coefficient level, transform information Tinfo, and filter information Finfo to each block. Specific description is given as follows.

The header information Hinfo is supplied to the inverse quantization unit 413, the inverse orthogonal transform unit 414, the prediction unit 419, and the in-loop filter unit 416. The prediction mode information Pinfo is supplied to the inverse quantization unit 413 and the prediction unit 419. The transform information Tinfo is supplied to the inverse quantization unit 413 and the inverse orthogonal transform unit 414. The filter information Finfo is supplied to the in-loop filter unit 416.

Of course, the above example is an example, and the present embodiment is not limited to this example. For example, each encoding parameter may be supplied to an arbitrary processing unit. Furthermore, other information may be supplied to an arbitrary processing unit.

<Inverse Quantization Unit>

The inverse quantization unit 413 performs processing regarding inverse quantization.

For example, the inverse quantization unit 413 acquires the transform information Tinfo and the quantized transform coefficient level supplied from the decoding unit 412. Furthermore, the inverse quantization unit 413 scales (inversely quantizes) a value of the quantized transform coefficient level to derive a transform coefficient Coeff_IQ after inverse quantization on the basis of the transform information Tinfo.

Note that this inverse quantization is performed as inverse processing of the quantization by the quantization unit 314 of the image encoding device 300. Furthermore, the inverse quantization is processing similar to the inverse quantization performed by the inverse quantization unit 317 of the image encoding device 300. In other words, the inverse quantization unit 317 performs processing (inverse quantization) similar to the inverse quantization unit 413.

The inverse quantization unit 413 supplies the derived transform coefficient Coeff_IQ to the inverse orthogonal transform unit 414.

<Inverse Orthogonal Transform Unit>

The inverse orthogonal transform unit 414 performs processing regarding inverse orthogonal transform. For example, the inverse orthogonal transform unit 414 acquires the transform coefficient Coeff_IQ supplied from the inverse quantization unit 413. Furthermore, the inverse orthogonal transform unit 414 acquires the transform information Tinfo supplied from the decoding unit 412.

The inverse orthogonal transform unit 414 performs inverse orthogonal transform processing for the transform coefficient Coeff_IQ on the basis of the transform information Tinfo to derive a prediction residual D'. For example, the inverse orthogonal transform unit 414 performs inverse secondary transform for the transform coefficient Coeff_IQ to generate a primary transform coefficient, and performs primary transform for the primary transform coefficient to generate the prediction residual D'.

Note that this inverse orthogonal transform is performed as inverse processing of the orthogonal transform by the orthogonal transform unit 313 of the image encoding device 300. Furthermore, the inverse orthogonal transform is processing similar to the inverse orthogonal transform performed by the inverse orthogonal transform unit 318 of the image encoding device 300. In other words, the inverse orthogonal transform unit 318 performs processing (inverse orthogonal transform) similar to the inverse orthogonal transform unit 414.

The inverse orthogonal transform unit 414 supplies the derived prediction residual D' to the calculation unit 415.

<Calculation Unit>

The calculation unit 415 performs processing regarding addition of information regarding an image. For example, the calculation unit 415 acquires the prediction residual D' supplied from the inverse orthogonal transform unit 414. Furthermore, the calculation unit 415 acquires a predicted image P supplied from the prediction unit 419. The calculation unit 415 adds the prediction residual D' and the predicted image P (prediction signal) corresponding to the prediction residual D' to derive a locally decoded image Rlocal, as illustrated in the following expression.

$$Rlocal = D' + P$$

The calculation unit 415 supplies the derived locally decoded image Rlocal to the in-loop filter unit 416 and the frame memory 418.

<In-Loop Filter Unit>

The in-loop filter unit 416 performs processing regarding in-loop filter processing. For example, the in-loop filter unit 416 acquires the locally decoded image Rlocal supplied from the calculation unit 415. Furthermore, the in-loop filter unit 416 acquires the filter information Finfo supplied from the decoding unit 412. Note that the information input to the in-loop filter unit 416 is arbitrary, and information other than the aforementioned information may be input.

The in-loop filter unit 416 appropriately performs filtering processing for the locally decoded image Rlocal on the basis of the filter information Finfo. For example, the in-loop filter unit 416 applies four in-loop filters of a bilateral filter, a deblocking filter (DBF), an adaptive offset filter (sample adaptive offset (SAO)), and an adaptive loop filter (ALF) in this order. Note that which filter is applied and in which order the filters are applied are arbitrary and can be selected as appropriate.

The in-loop filter unit 416 performs filtering processing corresponding to the filtering processing performed on the encoding side (for example, by the in-loop filter unit 320 of the image encoding device 300). Of course, the filtering processing performed by the in-loop filter unit 416 is arbitrary, and is not limited to the above example. For example, the in-loop filter unit 416 may apply a Wiener filter or the like.

The in-loop filter unit 416 supplies the filtered locally decoded image Rlocal to the rearrangement buffer 417 and the frame memory 418.

<Rearrangement Buffer>

The rearrangement buffer 417 receives the locally decoded image Rlocal supplied from the in-loop filter unit 416 as an input and holds (stores) the locally decoded image Rlocal. The rearrangement buffer 417 reconstructs a decoded image R for each unit of picture, using the locally decoded image Rlocal, and holds (stores) the decoded image R (in the buffer). The rearrangement buffer 417 rearranges the obtained decoded images R from a decoding order to a reproduction order. The rearrangement buffer 417 outputs a rearranged decoded image R group to the outside of the image decoding device 400 as moving image data.

<Frame Memory>

The frame memory 418 performs processing regarding storage of data regarding an image. For example, the frame memory 418 acquires the locally decoded image Rlocal supplied from the calculation unit 415. Then, the frame memory 418 reconstructs the decoded image R for each picture unit using the locally decoded image Rlocal. The frame memory 418 stores the reconstructed decoded image R in a buffer in the frame memory 418.

Furthermore, the frame memory 418 acquires the in-loop filtered locally decoded image Rlocal supplied from the in-loop filter unit 416. Then, the frame memory 418 reconstructs the decoded image R for each picture unit using the in-loop filtered locally decoded image Rlocal. The frame memory 418 stores the reconstructed decoded image R in a buffer in the frame memory 418.

Moreover, the frame memory 418 appropriately supplies the stored decoded image R (or a part thereof) to the prediction unit 419 as a reference image.

Note that the frame memory 418 may store the header information Hinfo, the prediction mode information Pinfo, the transform information Tinfo, the filter information Finfo, and the like related to generation of the decoded image.

<Prediction Unit>

The prediction unit 419 performs processing regarding generation of a predicted image. For example, the prediction unit 419 acquires the prediction mode information Pinfo supplied from the decoding unit 412. Furthermore, the prediction unit 419 performs prediction by a prediction method specified by the prediction mode information Pinfo to derive the predicted image P. At the time of derivation, the prediction unit 419 uses the decoded image R (or a part thereof) stored in the frame memory 418, the decoded image R being specified by the prediction mode information Pinfo, as the reference image. The decoded image R may be an image before filtering or after filtering. The prediction unit 419 supplies the derived predicted image P to the calculation unit 415.

<Encoding Control of LFNST Identifier>

The present technology described in <1. Signaling pattern of LFNST identifier> can be applied to the image encoding device 300 having the above configuration.

For example, the inverse orthogonal transform unit 414 performs the inverse processing of LFNST as the inverse secondary transform. At that time, the inverse orthogonal transform unit 414 acquires the LFNST identifier (lfnst_idx) supplied as the secondary transform control information (secondary transform identifier) from the decoding unit 412 (arrow 431). Then, the inverse orthogonal transform unit 414 performs the inverse secondary transform in accordance with the LFNST identifier.

That is, the decoding unit 412 supplies the LFNST identifier (lfnst_idx) to the inverse orthogonal transform unit 414 (arrow 431). The decoding unit 412 includes an LFNST identifier decoding unit 201 of a decoding device 200 (FIG. 13). For example, in a case where the LFNST identifier is signaled, the LFNST identifier decoding unit 201 decodes a bitstream to generate the LFNST identifier, and supplies the LFNST identifier to the inverse orthogonal transform unit 414. In a case where the LFNST identifier is not signaled, the LFNST identifier decoding unit 201 omits decoding related to the LFNST identifier, estimates a value thereof as "0", and supplies the LFNST identifier with the value "0" to the inverse orthogonal transform unit 414.

At that time, the LFNST identifier decoding unit 201 determines whether or not the LFNST identifier has been signaled (whether or not to perform decoding related to the LFNST identifier) on the basis of the signaled transform information Tinfo. For example, the decoding unit 412 decodes the bitstream to generate the transform information Tinfo. The LFNST identifier decoding unit 201 acquires various parameters to be used for decoding related to the LFNST identifier included in the transform information Tinfo. For example, the LFNST identifier decoding unit 201 acquires parameters such as treeType, transform_skip_flag [0], transform_skip_flag[1], transform_skip_flag[2], lfnstWidth, lfnstHeight, sps_lfnst_enabled_flag, intra_mip_ flag, cbWidth, cbHeight, IntraSubPartitionSplitType, LfnstDcOnly, and LfnstZeroOutSigCoeffFlag. These parameters are parameters described in Non-Patent Document described above (for example, Non-Patent Document 1).

The decoding unit 412 generates these parameters by decoding the bitstream. Then, the LFNST identifier decoding unit 201 controls decoding of the LFNST identifier (lfnst_idx) as described in <1. Signaling pattern of LFNST identifier> using these parameters.

For example, the decoding unit 412 controls decoding of the LFNST identifier by applying the above-described method 1. That is, the decoding unit 412 omits decoding related to secondary transform control information that is control information related to secondary transform and estimates that a value of the secondary transform control information is a predetermined value indicating skip of the secondary transform in a case where a transform skip flag of at least one component among valid components in image decoding is true, and decodes a bitstream to generate the secondary transform control information in a case where the transform skip flags of all the components among the valid components in image decoding are false.

For example, the decoding unit 412 controls decoding of the LFNST identifier according to the syntax table illustrated in FIG. 4. Note that the decoding unit 412 may control decoding of the LFNST identifier according to the syntax table illustrated in FIG. 6. According to these syntax tables, the decoding unit 412 can control decoding of the LFNST identifier according to the tree type and the transform skip flag as in the table illustrated in FIG. 3. The control method in each tree type is as described above in <1. Signaling pattern of LFNST identifier>.

Note that the decoding unit 412 may control decoding of the LFNST identifier by applying the above-described method 2. That is, when the transform skip flags of all the components among the valid components in the image decoding are true, the decoding unit 412 may omit the decoding related to the secondary transform control information and estimate that the value of the secondary transform control information is "0". Furthermore, when the transform skip flag of at least one component among the valid components in the image decoding is false, the decoding unit 412 may perform decoding regarding the secondary transform control information.

By doing so, the decoding unit 412 can control decoding of the LFNST identifier according to the tree type and the transform skip flag as in the table illustrated in FIG. 8. The control method in each tree type is as described above in <1. Signaling pattern of LFNST identifier>.

Furthermore, the decoding unit 412 may control decoding of the LFNST identifier by applying the above-described method 3. That is, in the case where the tree type of the image decoding is a dual tree chroma, and the decoding unit 412 may skip (omit) the decoding of the secondary transform control information and estimate that the value of the secondary transform control information is "0" in a case where the transform skip flags of all of components among valid components in the dual tree chroma are true. Furthermore, when the transform skip flag of at least one component among the valid components in the image decoding is false, the decoding unit 412 may perform decoding regarding the secondary transform control information.

By doing so, the decoding unit 412 can control decoding of the LFNST identifier according to the tree type and the transform skip flag as in the table illustrated in FIG. 9. The control method in each tree type is as described above in <1. Signaling pattern of LFNST identifier>.

Furthermore, the decoding unit 412 may control decoding of the LFNST identifier by applying the above-described method 4. That is, in the case where the tree type of the image decoding is a dual tree chroma, and the decoding unit 412 may omit the decoding of the secondary transform control information and estimate that the value of the secondary transform control information is "0" in a case where the transform skip flag of at least one component among the valid components in the dual tree chroma is true. Furthermore, when the transform skip flags of all the components are false, the decoding unit 412 may perform decoding regarding the secondary transform control information.

By doing so, the decoding unit 412 can control decoding of the LFNST identifier according to the tree type and the transform skip flag as in the table illustrated in FIG. 10. The control method in each tree type is as described above in <1. Signaling pattern of LFNST identifier>.

In any case of applying any method in the methods 1 to 4, in a case where the tree type is a dual tree chroma (DUAL_TREE_CHROMA) and the transform skip flags of both a Cb component and a Cr component of an image are true, the decoding unit 412 can skip decoding of the LFNST identifier. Therefore, the image decoding device 400 can suppress reduction in the encoding efficiency.

Configuration Example

Note that these processing units (the accumulation buffer 411 to the prediction unit 419) have an arbitrary configuration. For example, each processing unit may be configured by a logic circuit that implements the above-described processing. Furthermore, each processing unit may include, for example, a CPU, a ROM, a RAM, and the like, and implement the above-described processing by executing a program using the above resources. Of course, each processing unit may have both the configurations and implement part of the above-described processing by the logic circuit and implement the other of the processing by executing the program. The configurations of the processing units may be independent of one another. For example, some of the processing units may implement part of the above-described processing by the logic circuit, some of the processing units may implement the above-described processing by executing the program, and some of the processing units may implement the above-described processing by both the logic circuit and execution of the program.

<Flow of Image Decoding Processing>

Figure 18:
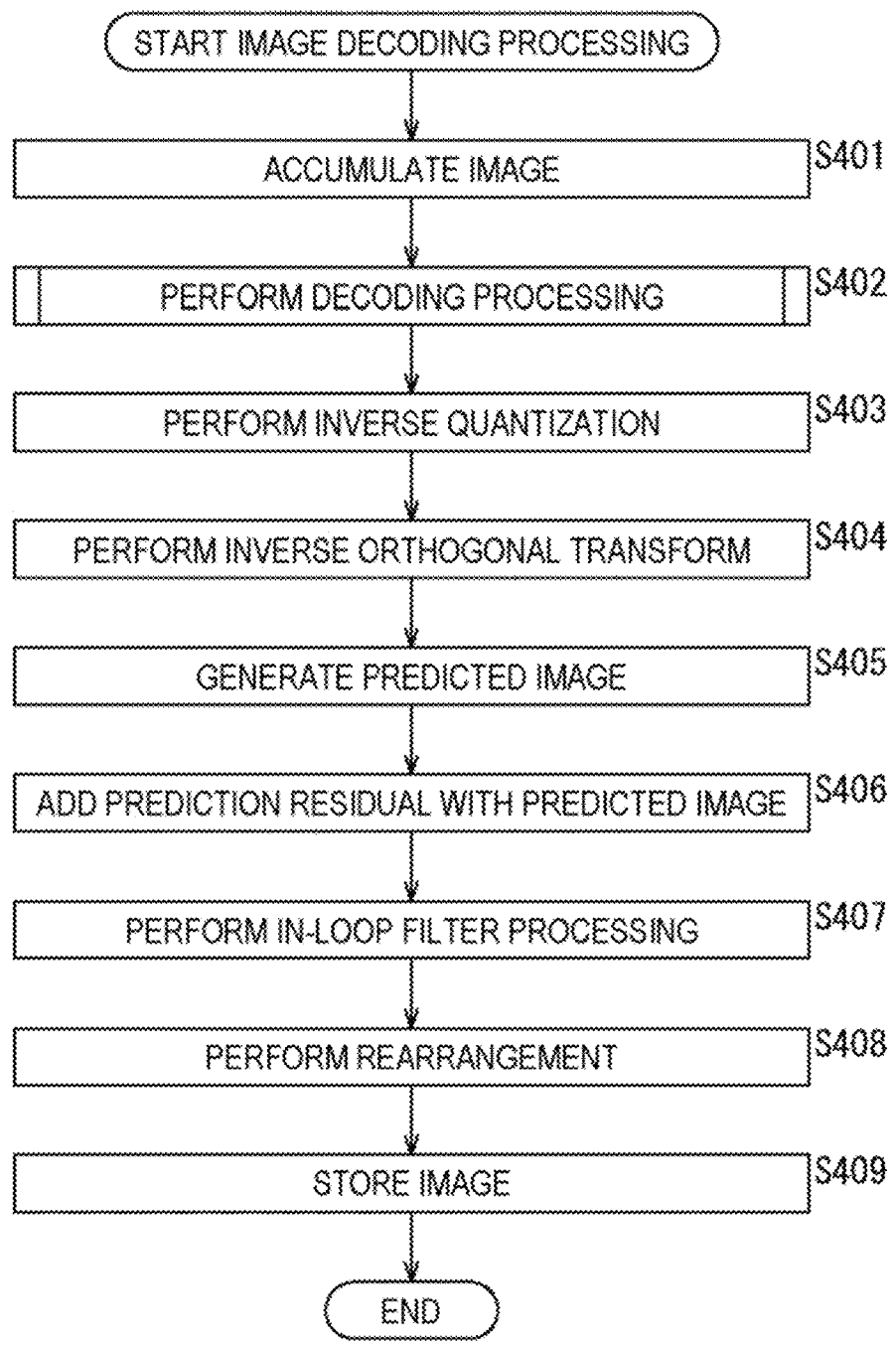
FIG. 18 is a flowchart for describing an example of a flow of image decoding processing.

Next, an example of a flow of image decoding processing executed by the image decoding device 400 having the above configuration will be described with reference to a flowchart of FIG. 18.

When the image decoding processing is started, in step S401, the accumulation buffer 411 acquires and holds (accumulates) the coded data (bitstream) supplied from the outside of the image decoding device 400.

In step S402, the decoding unit 412 decodes the coded data (bitstream) to obtain a quantized transform coefficient level. Furthermore, the decoding unit 412 parses (analyzes and acquires) various encoding parameters from the coded data (bitstream) by this decoding.

In step S403, the inverse quantization unit 413 performs the inverse quantization that is inverse processing of the quantization performed on the encoding side for the quantized transform coefficient level obtained by the processing in step S402 to obtain the transform coefficient Coeff_IQ.

In step S404, the inverse orthogonal transform unit 414 performs the inverse orthogonal transform processing that is inverse processing of the orthogonal transform processing performed on the encoding side for the transform coefficient Coeff_IQ obtained in step S403 to obtain the prediction residual D'. For example, the inverse orthogonal transform unit 414 performs the inverse secondary transform for the transform coefficient Coeff_IQ (secondary transform coefficient) to generate the primary transform coefficient, and performs the inverse primary transform for the primary transform coefficient to generate the prediction residual D'.

In step S405, the prediction unit 419 executes the prediction processing by a prediction method specified on the encoding side on the basis of the information parsed in step S402, and generates the predicted image P, for example, by reference to the reference image stored in the frame memory 418.

In step S406, the calculation unit 415 adds the prediction residual D' obtained in step S404 and the predicted image P obtained in step S405 to derive the locally decoded image Rlocal.

In step S407, the in-loop filter unit 416 performs the in-loop filter processing for the locally decoded image Rlocal obtained by the processing in step S406.

In step S408, the rearrangement buffer 417 derives the decoded image R, using the filtered locally decoded image Rlocal obtained by the processing in step S407, and rearranges the decoded image R group from the decoding order to the reproduction order. The decoded image R group rearranged in the reproduction order is output to the outside of the image decoding device 400 as a moving image.

Furthermore, in step S409, the frame memory 418 stores at least one of the locally decoded image Rlocal obtained by the processing in step S406, and the locally decoded image Rlocal after filtering processing obtained by the processing in step S407.

When the processing in step S409 ends, the image decoding processing ends.

<Decoding Control Regarding LFNST Identifier>

The present technology described in <1. Signaling pattern of LFNST identifier> can be applied to the image decoding processing having the above flow. For example, in step S402, (the LFNST identifier decoding unit 201 of) the decoding unit 412 decodes the bitstream to generate the LFNST identifier. Then, in step S404, the inverse orthogonal transform unit 414 performs the inverse secondary transform according to the LFNST identifier.

At that time, the decoding unit 412 controls decoding regarding the LFNST identifier on the basis of the transform information Tinfo. That is, the decoding unit 412 performs the decoding process illustrated in the flowchart in FIG. 14 as one of the processing in step S402.

For example, in step S201, the decoding unit 412 derives the decoding condition of the LFNST identifier on the basis of the above-described various parameters included in the transform information Tinfo. In step S202, the decoding unit 412 determines whether or not the decoding condition is satisfied. In a case where it is determined that the decoding condition condition is true, the LFNST identifier is signaled, and thus the decoding unit 412 decodes the bitstream to obtain the signaled LFNST identifier (lfnst_idx) in step S203.

Furthermore, in step S202, in a case where it is determined that the decoding condition derived in step S201 is false, the LFNST identifier has not been signaled. Therefore, the decoding unit 412 skips (omits) decoding of the LFNST identifier (lfnst_idx) in step S204. That is, in a case where the decoding condition condition is not satisfied, the decoding unit 412 skips decoding of the LFNST identifier (lfnst_idx) and estimates that the value of the LFNST identifier is "0" (lfnst_idx=0).

In the decoding processing as described above, (the LFNST identifier decoding unit 201 of) the decoding unit 412 applies, for example, the method 1 described above in <1. Signaling pattern of LFNST identifier>. That is, the decoding unit 412 omits decoding of secondary transform control information that is control information related to secondary transform in a case where a transform skip flag of at least one component among valid components in image decoding is true, and decodes the secondary transform control information in a case where the transform skip flags of all the components among the valid components in image decoding are false.

In that case, in step S201, the decoding unit 412 derives a variable NonTsUsed illustrated in FIG. 5, and derives an encoding condition illustrated in FIG. 5 using the derived variable NonTsUsed. Note that the decoding unit 412 may derive a variable TsUsed illustrated in FIG. 7 and derive the encoding condition condition illustrated in FIG. 7 using the derived variable TsUsed. Furthermore, the decoding unit 412 may derive the encoding condition, applying any of the methods 2 to 4.

By executing the image decoding processing in this manner, the decoding unit 412 can skip decoding of the LFNST identifier when the tree type is a dual tree chroma (DUAL_TREE_CHROMA) and the transform skip flags of both the Cb component and the Cr component of an image are true, in any case of applying any method in the methods 1 to 4. Therefore, the image decoding device 400 can suppress reduction in the encoding efficiency.

Supplement

Note that the image decoding device 400 can apply any inverse coefficient transform as the inverse secondary transform. Therefore, the decoding unit 412 may perform decoding of an arbitrary secondary transform identifier (arbitrary secondary transform control information) instead of the example of the LFNST identifier. Furthermore, some or all of the above-described methods 1 to 4 can be appropriately combined and applied.

6. Supplementary Note

<Computer>

The above-described series of processing can be executed by hardware or by software. In the case of executing the series of processing by software, a program that configures the software is installed in a computer. Here, the computer includes a computer incorporated in dedicated hardware, a computer, for example, general-purpose personal computer, capable of executing various functions by installing various programs, and the like.

Figure 19:
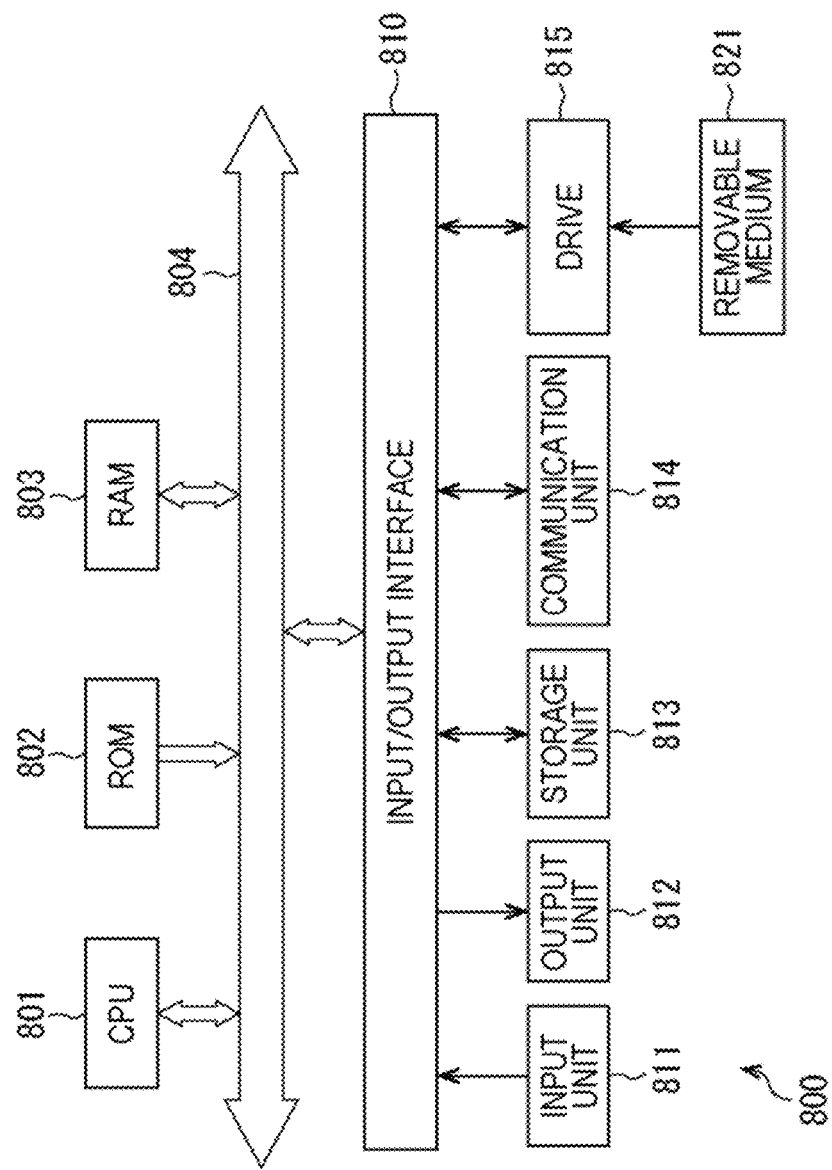
FIG. 19 is a block diagram illustrating a main configuration example of a computer.

FIG. 19 is a block diagram illustrating a configuration example of hardware of a computer that executes the above-described series of processing by a program.

In a computer 800 illustrated in FIG. 19, a central processing unit (CPU) 801, a read only memory (ROM) 802, and a random access memory (RAM) 803 are mutually connected by a bus 804.

An input/output interface 810 is also connected to the bus 804. An input unit 811, an output unit 812, a storage unit 813, a communication unit 814, and a drive 815 are connected to the input/output interface 810.

The input unit 811 includes, for example, a keyboard, a mouse, a microphone, a touch panel, an input terminal, and the like. The output unit 812 includes, for example, a display, a speaker, an output terminal, and the like. The storage unit 813 includes, for example, a hard disk, a RAM disk, a nonvolatile memory, and the like. The communication unit 814 includes, for example, a network interface. The drive 815 drives a removable medium 821 such as a magnetic disk, an optical disk, a magneto-optical disk, or a semiconductor memory.

In the computer configured as described above, the CPU 801 loads, for example, a program stored in the storage unit 813 into the RAM 803 and executes the program via the input/output interface 810 and the bus 804, so that the above-described series of processing is performed. Furthermore, the RAM 803 appropriately stores data and the like necessary for the CPU 801 to execute the various types of processing.

The program to be executed by the computer can be recorded and applied on the removable medium 821 as a package medium or the like, for example, and can be provided. In that case, the program can be installed to the storage unit 813 via the input/output interface 810 by attaching the removable medium 821 to the drive 815.

Furthermore, this program can be provided via a wired or wireless transmission medium such as a local area network, the Internet, or digital satellite broadcast. In that case, the program can be received by the communication unit 814 and installed in the storage unit 813.

Other than the above method, the program can be installed in the ROM 802 or the storage unit 813 in advance.

<Applicable Object of Present Technology>

The present technology can be applied to any image encoding/decoding method. That is, specifications of various types of processing regarding image encoding/decoding such as transform (inverse transform), quantization (inverse quantization), encoding (decoding), and prediction are arbitrary and are not limited to the above-described examples as long as no contradiction occurs with the above-described present technology. Furthermore, part of the processing may be omitted as long as no contradiction occurs with the above-described present technology.

Furthermore, the present technology can be applied to a multi-view image encoding/decoding system that performs encoding/decoding of a multi-view image including images of a plurality of viewpoints (views). In this case, the present technology is simply applied to encoding/decoding of each viewpoint (view).

Furthermore, the present technology can be applied to a hierarchical image encoding (scalable encoding)/decoding system that encodes/decodes a hierarchical image that is multi-layered (hierarchized) so as to have a scalability function for a predetermined parameter. In this case, the present technology is simply applied to encoding/decoding of each layer (layer).

Furthermore, in the above description, the encoding device 100, the decoding device 200, the image encoding device 300, the image decoding device 400 have been described as application examples of the present technology, but the present technology can be applied to an arbitrary configuration.

The present technology can be applied to, for example, various electron devices, such as transmitters and receivers (such as television receivers and mobile phones) in satellite broadcasting, cable broadcasting such as cable TV, distribution on the Internet, and distribution to terminals by cellular communication, or devices (for example, hard disk recorders and cameras) that record images on media such as optical disks, magnetic disks, and flash memories, and reproduce images from these storage media.

Furthermore, the present technology can be implemented as a configuration of a part of a device such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit (that is, a configuration of a part of the device).

Furthermore, for example, the present technology can also be applied to a network system including a plurality of devices. For example, the present technology may be implemented as cloud computing shared and processed in cooperation by a plurality of devices via a network. For example, the present technology may be implemented in a cloud service that provides a service regarding an image (moving image) to an arbitrary terminal such as a computer, an audio visual (AV) device, a portable information processing terminal, or an internet of things (IoT) device.

Note that, in this specification, the term "system" means a set of a plurality of configuration elements (devices, modules (parts), and the like), and whether or not all the configuration elements are in the same casing is irrelevant. Therefore, a plurality of devices housed in separate casings and connected via a network, and one device that houses a plurality of modules in one casing are both systems.

Field and Application to which Present Technology is Applicable

The systems, devices, processing units, and the like to which the present technology is applied can be used in arbitrary fields such as traffic, medical care, crime prevention, agriculture, livestock industry, mining, beauty, factory, household appliance, weather, and natural surveillance, for example. Furthermore, uses thereof are also arbitrary.

For example, the present technology can be applied to systems and devices provided for providing content for appreciation and the like. Furthermore, for example, the present technology can also be applied to systems and devices used for traffic, such as traffic condition monitoring and automatic driving control. Moreover, for example, the present technology can also be applied to systems and devices provided for security. Furthermore, for example, the present technology can be applied to systems and devices provided for automatic control of machines and the like. Moreover, for example, the present technology can also be applied to systems and devices provided for agriculture or livestock industry. Furthermore, the present technology can also be applied to systems and devices that monitor nature states such as volcanos, forests, and ocean, wildlife, and the like. Moreover, for example, the present technology can also be applied to systems and devices provided for sports.

Others

Note that the "flag" in the present specification is information for identifying a plurality of states, and includes not only information used for identifying two states of true (1) and false (0) but also information capable of identifying three or more states. Therefore, the value that the "flag" can take may be, for example, a binary value of 1/0 or may be a ternary value or more. That is, the number of bits constituting the "flag" is arbitrary, and may be 1 bit or a plurality of bits. Furthermore, the identification information (including flag) is assumed to be in not only a form of including the identification information in a bitstream but also a form of including difference information of the identification information from certain reference information in a bitstream. Therefore, in the present specification, the "flag" and "identification information" include not only the information itself but also the difference information for the reference information.

Furthermore, various types of information (metadata and the like) regarding coded data (bitstream) may be transmitted or recorded in any form as long as the various types of information are associated with the coded data. Here, the term "associate" means that, for example, one data can be used (linked) when the other data is processed. That is, data associated with each other may be collected as one data or may be individual data. For example, information associated with coded data (image) may be transmitted on a transmission path different from that of the coded data (image). Furthermore, for example, information associated with coded data (image) may be recorded on a different recording medium (or another recording area of the same recording medium) from the coded data (image). Note that this "association" may be a part of data instead of entire data. For example, an image and information corresponding to the image may be associated with each other in an arbitrary unit such as a plurality of frames, one frame, or a part in a frame.

Note that, in the present specification, terms such as "combining", "multiplexing", "adding", "integrating", "including", "storing", and "inserting" mean putting a plurality of things into one, such as putting coded data and metadata into one data, and means one method of the above-described "association".

Furthermore, embodiments of the present technology are not limited to the above-described embodiments, and various modifications can be made without departing from the gist of the present technology.

For example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Furthermore, for example, the above-described program may be executed in an arbitrary device. In that case, the device is only required to have necessary functions (functional blocks and the like) and obtain necessary information.

Furthermore, for example, each step of one flowchart may be executed by one device, or may be shared and executed by a plurality of devices. Moreover, in a case where a plurality of processes is included in one step, the plurality of processes may be executed by one device, or may be shared and executed by a plurality of devices. In other words, the plurality of processes included in one step can be executed as processes of a plurality of steps. Conversely, the processing described as a plurality of steps can be collectively executed as one step.

Furthermore, for example, in the program executed by the computer, the processing of the steps describing the program may be executed in chronological order according to the order described in the present specification, or may be individually executed in parallel or at necessary timing when a call is made. That is, the processing of each step may be executed in an order different from the above-described order as long as no contradiction occurs. Moreover, the processing of the steps describing the program may be executed in parallel with the processing of another program, or may be executed in combination with the processing of another program.

Furthermore, for example, a plurality of techniques related to the present technology can be implemented independently as a single body as long as there is no contradiction. Of course, an arbitrary number of the present technologies can be implemented together. For example, part or whole of the present technology described in any of the embodiments can be implemented in combination with part or whole of the present technology described in another embodiment. Further, part or whole of the above-described arbitrary present technology can be implemented in combination with another technology not described above.

Note that the present technology can also have the following configurations.

(1) An image processing device including:
an encoding unit configured to
omit encoding of secondary transform control information that is control information related to secondary transform in a case where a transform skip flag of at least one component among valid components in image encoding is true; and
encode the secondary transform control information in a case where the transform skip flags of all the components among the valid components in image encoding are false.

(2) The image processing device according to (1), in which,
in a case where a tree type of the image encoding is a single tree, the encoding unit
omits the encoding of the secondary transform control information in a case where at least one of a Y component transform skip flag that is the transform skip flag of a Y component, a Cb component transform skip flag that is a transform skip flag of a Cb component, or a Cr component transform skip flag that is the transform skip flag of a Cr component is true, and
encodes the secondary transform control information in a case where the Y component transform skip flag, the Cb component transform skip flag, and the Cr component transform skip flag are false.

(3) The image processing device according to (1) or (2), in which,
in a case where a tree type of the image encoding is a dual tree luma, the encoding unit
omits the encoding of the secondary transform control information in a case where a Y component transform skip flag that is the transform skip flag of a Y component is true, and
encodes the secondary transform control information in a case where the Y component transform skip flag is false.

(4) The image processing device according to any one of (1) to (3), in which,
in a case where a tree type of the image encoding is a dual tree chroma, the encoding unit
omits the encoding of the secondary transform control information in a case where at least one of a Cb component transform skip flag that is a transform skip flag of a Cb component, or a Cr component transform skip flag that is the transform skip flag of a Cr component is true, and
encodes the secondary transform control information in a case where the Cb component transform skip flag and the Cr component transform skip flag are false.

(5) The image processing device according to any one of (1) to (4), in which
the secondary transform control information includes a secondary transform identifier that is an identifier indicating a type of the secondary transform.

(6) The image processing device according to any one of (1) to (5), in which
the secondary transform is low frequency non-separable transform (LFNST).

(7) The image processing device according to any one of (1) to (6), in which
the encoding unit
omits the encoding of the secondary transform control information in a case where the transform skip flags of all the components among the valid components in image encoding are true, and
encodes the secondary transform control information in a case where the transform skip flag of at least one component among the valid components in image encoding is false.

(8) The image processing device according to any one of (1) to (7), in which,
in a case where a tree type of the image encoding is a dual tree chroma, and the encoding unit
omits the encoding of the secondary transform control information in a case where the transform skip flags of all of components among valid components in the dual tree chroma are true, and
encodes the secondary transform control information in a case where the transform skip flag of at least one component among the valid components in the dual tree chroma is false.

(9) The image processing device according to any one of (1) to (8), in which,
in a case where a tree type of the image encoding is a dual tree chroma, and the encoding unit
omits the encoding of the secondary transform control information in a case where the transform skip flag of at least one component among valid components in the dual tree chroma is true, and
encodes the secondary transform control information in a case where the transform skip flags of all the components among the valid components in the dual tree chroma are false.

(10) An image processing method including:
omitting encoding of secondary transform control information that is control information related to secondary transform in a case where a transform skip flag of at least one component among valid components in image encoding is true; and
encoding the secondary transform control information in a case where the transform skip flags of all the components among the valid components in image encoding are false.

(11) An image processing device including:
a decoding unit configured to
omit decoding related to secondary transform control information that is control information related to secondary transform and estimate that a value of the secondary transform control information is a predetermined value indicating skip of the secondary transform in a case where a transform skip flag of at least one component among valid components in image decoding is true; and
decode a bitstream to generate the secondary transform control information in a case where the transform skip flags of all the components among the valid components in image decoding are false.

(12) The image processing device according to (11), in which,
in a case where a tree type of the image decoding is a single tree, the decoding unit
omits the decoding of the secondary transform control information and estimates that the value of the secondary transform control information is a predetermined value indicating skip of the secondary transform in a case where at least one of a Y component transform skip flag that is the transform skip flag of a Y component, a Cb component transform skip flag that is the transform skip flag of a Cb component, or a Cr component transform skip flag that is the transform skip flag of a Cr component is true, and
decodes the bitstream to generate the secondary transform control information in a case where the Y component transform skip flag, the Cb component transform skip flag, and the Cr component transform skip flag are false.

(13) The image processing device according to (11) or (12), in which,
in a case where a tree type of the image decoding is a dual tree luma, the decoding unit
omits the decoding related to the secondary transform control information and estimates that the value of the secondary transform control information is a predetermined value indicating skip of the secondary transform in a case where a Y component transform skip flag that is the transform skip flag of a Y component is true, and
decodes the bitstream to generate the secondary transform control information in a case where the Y component transform skip flag is false.

(14) The image processing device according to any one of (11) to (13), in which,
in a case where a tree type of the image decoding is a dual tree chroma, the decoding unit
omits the decoding of the secondary transform control information and estimates that the value of the secondary transform control information is a predetermined value indicating skip of the secondary transform in a case where at least one of a Cb component transform skip flag that is the transform skip flag of a Cb component or a Cr component transform skip flag that is the transform skip flag of a Cr component is true, and
decodes the bitstream to generate the secondary transform control information in a case where the Cb component transform skip flag and the Cr component transform skip flag are false.

(15) The image processing device according to any one of (11) to (14), in which
the secondary transform control information includes a secondary transform identifier that is an identifier indicating a type of the secondary transform.

(16) The image processing device according to any one of (11) to (15), in which
the secondary transform is low frequency non-separable transform (LFNST).

(17) The image processing device according to any one of (11) to (16), in which
the decoding unit
omits the decoding related to the secondary transform control information and estimates that the value of the secondary transform control information is a predetermined value indicating skip of the secondary transform in a case where the transform skip flags of all the components among the valid components in image decoding are true, and
decodes the bitstream to generate the secondary transform control information in a case where the transform skip flag of at least one component among the valid components in image decoding is false.

(18) The image processing device according to any one of (11) to (17), in which,
in a case where a tree type of the image decoding is a dual tree chroma, and the decoding unit
omits the decoding related to the secondary transform control information and estimates that the value of the secondary transform control information is a predetermined value indicating skip of the secondary transform in a case where the transform skip flags of all of components among valid components in the dual tree chroma are true, and
decodes the bitstream to generate the secondary transform control information in a case where the transform skip flag of at least one component among the valid components in the dual tree chroma is false.

(19) The image processing device according to any one of (11) to (18), in which,
in a case where a tree type of the image decoding is a dual tree chroma, and the decoding unit
omits the decoding related to the secondary transform control information and estimates that the value of the secondary transform control information is a predetermined value indicating skip of the secondary transform in a case where the transform skip flag of at least one component among the valid components in the dual tree chroma is true, and decodes the bitstream to generate the secondary transform control information in a case where the transform skip flags of all the components among the valid components in the dual tree chroma are false.

(20) An image processing method including:

omitting decoding related to secondary transform control information that is control information related to secondary transform and estimating that a value of the secondary transform control information is a predetermined value indicating skip of the secondary transform in a case where a transform skip flag of at least one component among valid components in image decoding is true; and decoding a bitstream to generate the secondary transform control information in a case where the transform skip flags of all the components among the valid components in image decoding are false.

REFERENCE SIGNS LIST

100 Encoding device
101 LFNST identifier encoding unit
200 Decoding device
201 LFNST identifier decoding unit
300 Image encoding device
301 Control unit
313 Orthogonal transform unit
315 Encoding unit
400 Image decoding device
412 Decoding unit
414 Inverse orthogonal transform unit

The invention claimed is:

1. An image processing device that performs image encoding, the image encoding using a primary transform and selectively using a secondary transform, the image processing device comprising:

circuitry configured to:

determine a tree type of the image encoding from among a plurality of tree types;

determine values of transform skip flags corresponding to valid components of the image encoding corresponding to the determined tree type, the valid components being a subset of all components of the image encoding corresponding the plurality of tree types; and perform the image encoding based on the determined values and the determined tree type, wherein the image encoding comprises:

omitting encoding of control information related to the secondary transform in a case where a transform skip flag of at least one component of the valid components is determined to be true; and encoding the control information in a case where the transform skip flags of all components of the valid components in the image encoding are determined to be false, wherein any transform skip flag having a first binary value is determined to be true, and wherein any transform skip flag having a second binary value, different from the first binary value, is determined to be false.

2. The image processing device according to claim 1, wherein, wherein the determined tree type of the image encoding is a single tree, and the transform skip flags corresponding to the valid components in the image encoding comprise a Y component transform skip flag that is the transform skip flag of a Y component, a Cb component transform skip flag that is the transform skip flag of a Cb component, and a Cr component transform skip flag that is the transform skip flag of a Cr component, and wherein the image encoding comprises:

omitting the encoding of the control information in a case where at least one of the Y component transform skip flag, the Cb component transform skip flag, or the Cr component transform skip flag is determined to be true, and encoding the control information in a case where all of the Y component transform skip flag, the Cb component transform skip flag, and the Cr component transform skip flag are determined to be false.

3. The image processing device according to claim 1, wherein, wherein the determined tree type of the image encoding is a dual tree luma, and the transform skip flags corresponding to the valid components in the image encoding comprise a Y component transform skip flag that is the transform skip flag of a Y component, wherein the image encoding comprises:

omitting the encoding of the control information in a case where the Y component transform skip flag is determined to be true, and encoding the control information in a case where the Y component transform skip flag is determined to be false.

4. The image processing device according to claim 1, wherein, wherein the determined tree type of the image encoding is a dual tree chroma, and the transform skip flags corresponding to the valid components in the image encoding comprise a Cb component transform skip flag that is the transform skip flag of a Cb component, and a Cr component transform skip flag that is the transform skip flag of a Cr component, and wherein the image encoding comprises:

omitting the encoding of the control information in a case where at least one of the Cb component transform skip flag or the Cr component transform skip flag is determined to be true, and encoding the control information in a case where all of the Cb component transform skip flag and the Cr component transform skip flag are determined to be false.

5. The image processing device according to claim 1, wherein the control information includes a secondary transform identifier that is an identifier indicating a type of the secondary transform.

6. The image processing device according to claim 1, wherein the secondary transform is low frequency non-separable transform (LFNST).

7. The image processing device according to claim 1, wherein, the image encoding comprises:

omitting the encoding of the control information in a case where the transform skip flags of all the components of the valid components in the image encoding are determined to be true, and encoding the control information in a case where the transform skip flag of at least one component of the valid components in the image the encoding is determined to be false.

8. The image processing device according to claim 1, wherein,
wherein the determined tree type of the image encoding is a dual tree chroma, and
wherein the image encoding comprises:
omitting the encoding of the control information in a case where the transform skip flags of all the components of the valid components in the dual tree chroma are determined to be true, and
encoding the control information in a case where the transform skip flag of at least one component of the valid components in the dual tree chroma is determined to be false.

9. The image processing device according to claim 1, wherein,
wherein the determined tree type of the image encoding is a dual tree chroma, and
wherein the image encoding comprises:
omitting the encoding of the control information in a case where the transform skip flag of at least one component of the valid components in the dual tree chroma is determined to be true, and
encoding the control information in a case where the transform skip flags of all the components of the valid components in the dual tree chroma are determined to be false.

10. An image processing method for image encoding that uses a primary transform and that selectively uses a secondary transform, the image processing method performed by an image processing device and comprising:
determining a tree type of the image encoding from among a plurality of tree types;
determining values of transform skip flags corresponding to valid components of the image encoding corresponding to the determined tree type, the valid components being a subset of all components of the image encoding corresponding the plurality of tree types; and
performing the image encoding based on the determined values, wherein the image encoding comprises:
omitting encoding of control information related to the secondary transform in a case where a transform skip flag of at least one component of the valid components is determined to be true; and
encoding the control information in a case where the transform skip flags of all components of the valid components in the image encoding are determined to be false,
wherein any transform skip flag having a first binary value is determined to be true, and
wherein any transform skip flag having a second binary value, different from the first binary value, is determined to be false.

11. An image processing device that performs image decoding, the image decoding using a primary transform and selectively using a secondary transform, the image processing device comprising:
circuitry configured to
determine a tree type of the image decoding from among a plurality of tree types;
determine values of transform skip flags corresponding to valid components of the image decoding corresponding to the determined tree type, the valid components being a subset of all components of the image decoding corresponding the plurality of tree types; and
perform the image decoding based on the determined values and the determined tree type, wherein the image decoding comprises:
omitting decoding related to control information related to the secondary transform and estimating that a value of the control information is a predetermined value in a case where a transform skip flag of at least one component of the valid components is determined to be true,
wherein the predetermined value indicates that the secondary transform is skipped in the image decoding; and
decoding a bitstream to generate the control information in a case where the transform skip flags of all components of the valid components in the image decoding are determined to be false,
wherein any transform skip flag having a first binary value is determined to be true, and
wherein any transform skip flag having a second binary value, different from the first binary value, is determined to be false.

12. The image processing device according to claim 11, wherein,
wherein the determined tree type of the image decoding is a single tree, and the transform skip flags corresponding to the valid components in the image decoding comprise a Y component transform skip flag that is the transform skip flag of a Y component, a Cb component transform skip flag that is the transform skip flag of a Cb component, and a Cr component transform skip flag that is the transform skip flag of a Cr component, and
wherein the image decoding comprises:
omitting the decoding of the control information and estimating that the value of the control information is the predetermined value in a case where at least one of the Y component transform skip flag, the Cb component transform skip flag, or the Cr component transform skip flag is determined to be true, and
decoding the bitstream to generate the control information in a case where all of the Y component transform skip flag, the Ch component transform skip flag, and the Cr component transform skip flag are determined to be false.

13. The image processing device according to claim 11, wherein,
wherein the determined tree type of the image decoding is a dual tree luma, and the transform skip flags corresponding to the valid components in the image decoding comprise a Y component transform skip flag that is the transform skip flag of a Y component,
wherein the image decoding comprises:
omitting the decoding related to the control information and estimating that the value of the control information is the predetermined value in a case where the Y component transform skip flag is determined to be true, and
decoding the bitstream to generate the control information in a case where the Y component transform skip flag is determined to be false.

14. The image processing device according to claim 11, wherein,
wherein the determined tree type of the image decoding is a dual tree chroma, and the transform skip flags corresponding to the valid components in the image decoding comprise a Cb component transform skip flag that is the transform skip flag of a Cb component, and a Cr component transform skip flag that is the transform skip flag of a Cr component, and
wherein the image decoding comprises:
omitting the decoding of the control information and estimating that the value of the control information is the predetermined value in a case where at least one of the Cb component transform skip flag or the Cr component transform skip flag is determined to be true, and decoding the bitstream to generate the control information in a case where all of the Cb component transform skip flag and the Cr component transform skip flag are determined to be false.

15. The image processing device according to claim 11, wherein the control information includes a secondary transform identifier that is an identifier indicating a type of the secondary transform.

16. The image processing device according to claim 11, wherein the secondary transform is low frequency non-separable transform (LFNST).

17. The image processing device according to claim 11, wherein the image decoding comprises:

omitting the decoding related to the control information and estimating that the value of the control information is the predetermined value in a case where the transform skip flags of all of the components of the valid components in the image decoding are determined to be true, and decoding the bitstream to generate the control information in a case where the transform skip flag of at least one component of the valid components in the image decoding is determined to be false.

18. The image processing device according to claim 11, wherein, wherein the determined tree type of the image decoding is a dual tree chroma, and wherein the image decoding comprises:

omitting the decoding related to the control information and estimating that the value of the control information is the predetermined value in a case where the transform skip flags of all of the components of the valid components in the dual tree chroma are determined to be true, and decoding the bitstream to generate the control information in a case where the transform skip flag of at least one component of the valid components in the dual tree chroma is determined to be false.

19. The image processing device according to claim 11, wherein, wherein the determined tree type of the image decoding is a dual tree chroma, and wherein the image decoding comprises:

omitting the decoding related to the control information and estimating that the value of the control information is the predetermined value in a case where the transform skip flag of at least one component of the valid components in the dual tree chroma is determined to be true, and decoding the bitstream to generate the control information in a case where the transform skip flags of all of the components of the valid components in the dual tree chroma are determined to be false.

20. An image processing method for image decoding that uses a primary transform and that selectively uses a secondary transform, the image processing method performed by an image processing device and comprising:

determining a tree type of the image decoding from among a plurality of tree types;

determining values of transform skip flags corresponding to valid components of the image decoding corresponding to the determined tree type, the valid components being a subset of all components of the image decoding corresponding the plurality of tree types; and performing the image decoding based on the determined values and the determined tree type, wherein the image decoding comprises:

omitting decoding related to control information related to the secondary transform and estimating that a value of the secondary transform control information is a predetermined value in a case where a transform skip flag of at least one component of the valid components is determined to be true, wherein the predetermined value indicates that the secondary transform is skipped in the image decoding; and decoding a bitstream to generate the control information in a case where the transform skip flags of all components of the valid components in the image decoding are determined to be false, wherein any transform skip flag having a first binary value is determined to be true, and wherein any transform skip flag having a second binary value, different from the first binary value, is determined to be false.

* * * * *